United States Patent [19]

Yamamoto et al.

[11] Patent Number: 5,728,240
[45] Date of Patent: Mar. 17, 1998

[54] POSITIONALLY ADJUSTABLE MEMBER AND APPLICATIONS THEREFOR

[75] Inventors: Tatsushi Yamamoto, Nara-ken; Tomoyuki Sagara, Yamatokoriyama; Tetsurou Muramatsu, Nara; Toshiyuki Tanaka, Moriguchi; Renzaburou Miki, Tenri, all of Japan

[73] Assignee: Sharp Kabushiki Kaisha, Osaka, Japan

[21] Appl. No.: 463,775

[22] Filed: Jun. 5, 1995

[30] Foreign Application Priority Data

Dec. 16, 1994 [JP] Japan .................................. 6-313179
Dec. 16, 1994 [JP] Japan .................................. 6-313188
Dec. 27, 1994 [JP] Japan .................................. 6-324537

[51] Int. Cl.⁶ .................................................. C21D 11/00
[52] U.S. Cl. ........................... 148/563; 360/104; 29/603
[58] Field of Search ............................... 148/525, 527, 148/563; 29/603; 360/104

[56] References Cited

U.S. PATENT DOCUMENTS

| 5,184,263 | 2/1993 | Fukakusa et al. | 360/103 |
| 5,307,224 | 4/1994 | Minase | 360/105 |
| 5,325,245 | 6/1994 | Shimizu et al. | 360/77.08 |

FOREIGN PATENT DOCUMENTS

| 58-32226 | 2/1983 | Japan . |
| 62-215908 | 9/1987 | Japan . |
| 63-019608 | 1/1988 | Japan . |
| 63-032717 | 2/1988 | Japan . |
| 63-306513 | 12/1988 | Japan . |
| 2-68707 | 3/1990 | Japan . |
| 3-62348 | 3/1991 | Japan . |
| 4-113521 | 4/1992 | Japan . |
| 4-189459 | 7/1992 | Japan . |
| 4-318316 | 11/1992 | Japan . |
| 5-20757 | 1/1993 | Japan . |
| 5-28446 | 2/1993 | Japan . |
| 5-62140 | 3/1993 | Japan . |
| 5-73866 | 3/1993 | Japan . |
| 5-120649 | 5/1993 | Japan . |
| 5-159357 | 6/1993 | Japan . |
| 5-334636 | 12/1993 | Japan . |
| 5-334637 | 12/1993 | Japan . |
| 6-28644 | 2/1994 | Japan . |
| 6-28645 | 2/1994 | Japan . |
| 6-203502 | 7/1994 | Japan . |
| 7-65335 | 3/1995 | Japan . |

OTHER PUBLICATIONS

ASM Handbook, (Formerly 10th Ed., Metals Handbook), vol. 2, p. 897, 1990.

*Primary Examiner*—John Sheehan

[57] ABSTRACT

A method of adjusting position of a member including an adjustable portion made of material having shape memory effect, comprising the steps of: (a) heat-treating for shape memory the member in a first shape such that the first shape is memorized in the adjustable portion; (b) plastically deforming the adjustable portion to a second shape after cooling the adjustable portion to less than a shape recovery temperature; and (c) locally heating the adjustable portion to more than the shape recovery temperature so as to subject the adjustable portion to local shape recovery.

24 Claims, 23 Drawing Sheets

Fig. 7
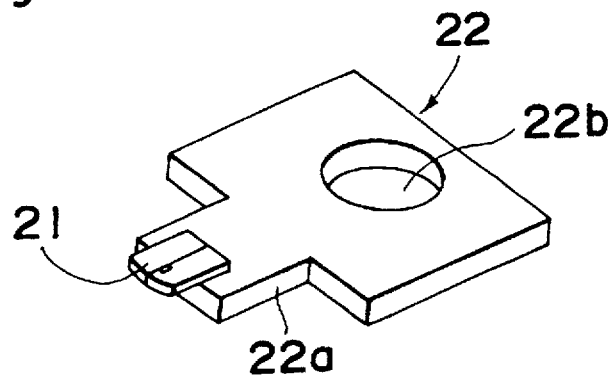
Fig. 8A
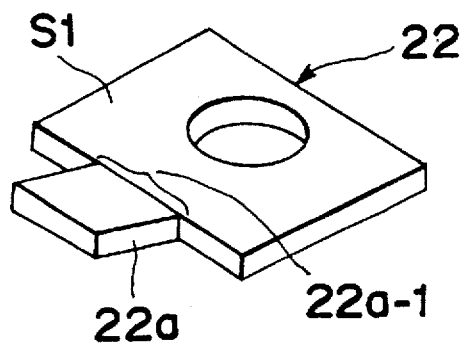
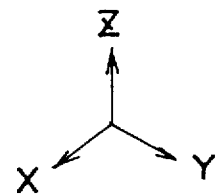
Fig. 8B
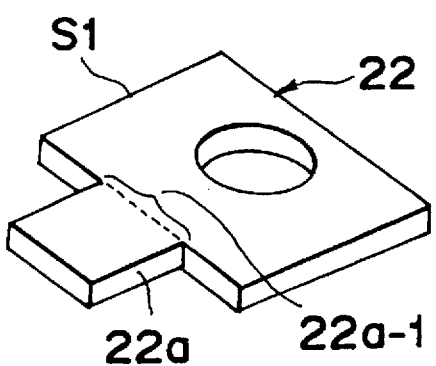

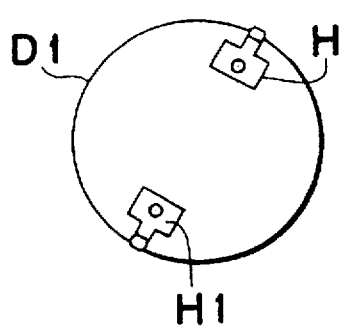
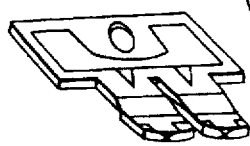
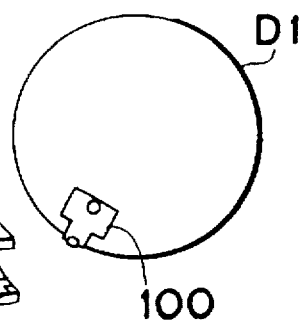
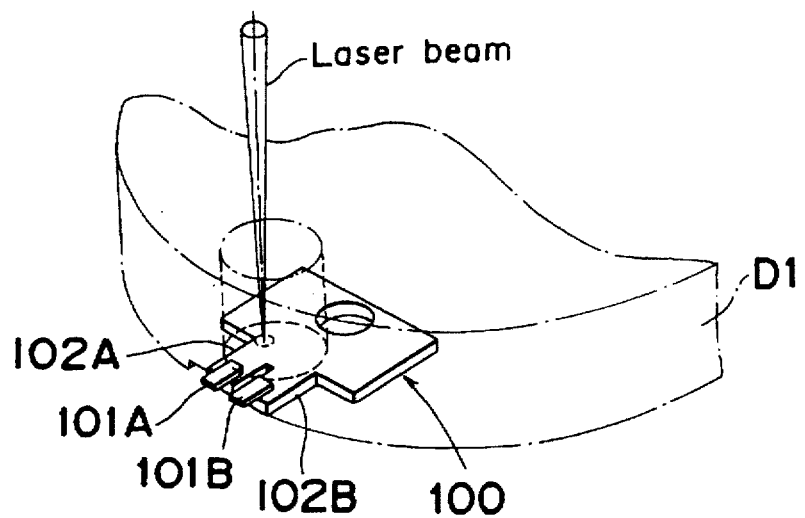
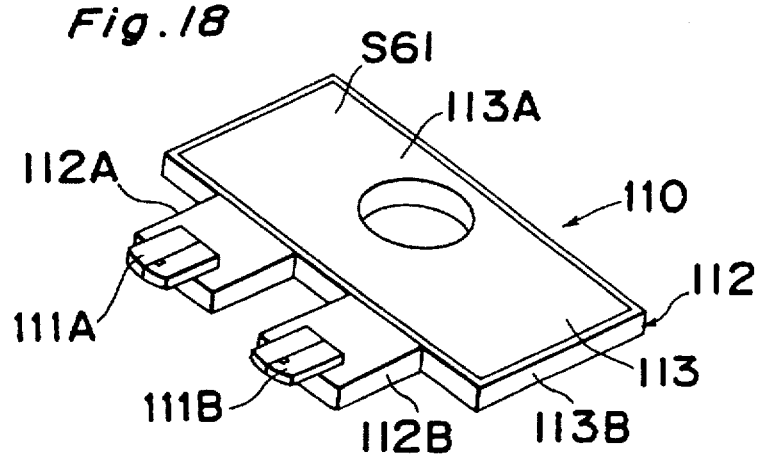

(Blanking)

(Shape memory)

(Plastic deformation)

(Chip attachment)

(Laser beam irradiation)

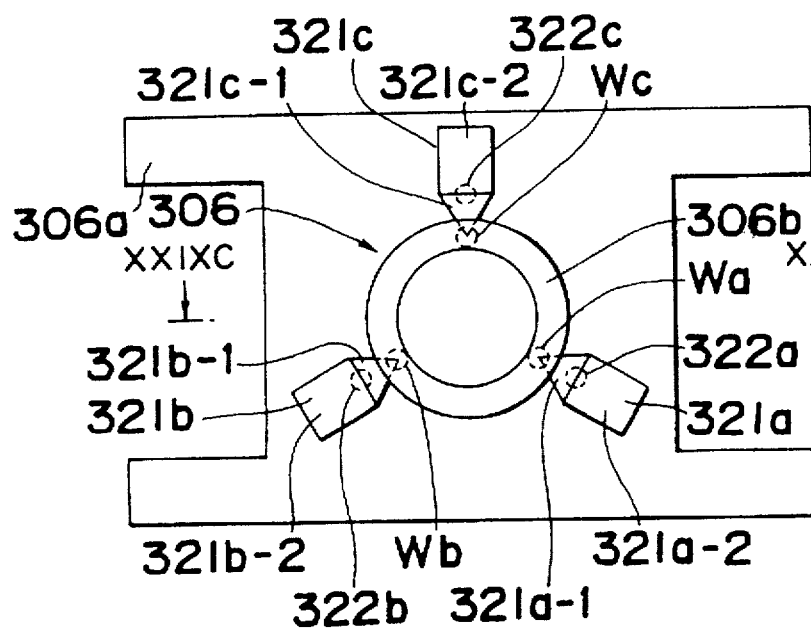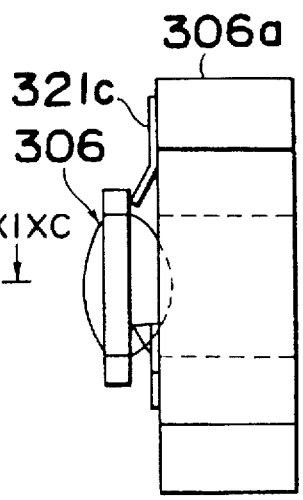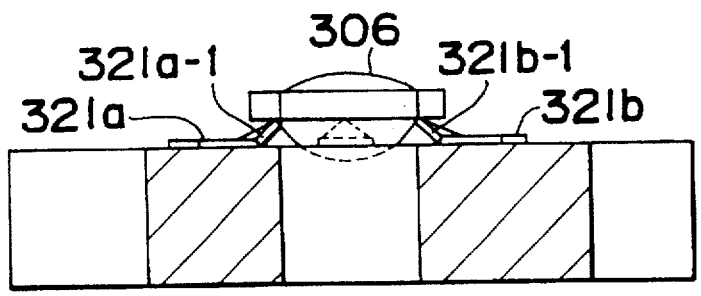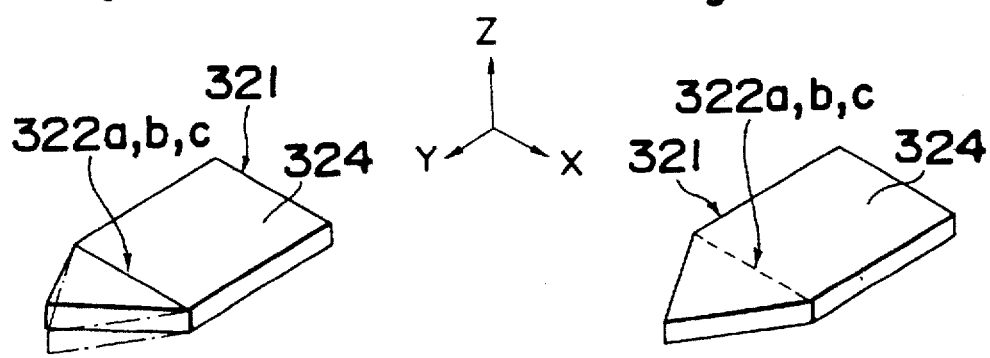

POSITIONALLY ADJUSTABLE MEMBER AND APPLICATIONS THEREFOR

BACKGROUND OF THE INVENTION

The present invention relates to a method of adjusting position of a member such as an optical component, an electronic component and a mechanical component requiring highly accurate positional adjustment, and the member subjected to positional adjustment.

Recently, trends of appliances for industrial use and home use towards lighter weight and more compact size, higher accuracy, higher functions and more functions are in rapid progress. Therefore, in order to produce these appliances at relatively low cost and stably not only in mass production but in multikind and small quantity production, development of effective production technique is desired. A key to materialization of a processing technique satisfying such conditions resides in rise of productivity in assembly steps of components having main functions in the appliances and requiring highly accurate positional adjustment.

In recent appliances, main components requiring accuracy of microns or submicrons in attitudinal or positional adjustment are on the increase in number. Examples requiring highly accurate attitudinal adjustment include mounting of a magnetic head on a rotary drum in a video appliance, mounting of a magnetic head chip on a base plate, mounting of a stationary multichannel magnetic head in a digital audio appliance or a data streamer, mounting of a tape guide in a magnetic recording unit, mounting of a lens, a prism or a hologram pickup of integration of these components on an optical system in a compact disc player using a laser diode or a magneto-optical disc apparatus, alignment of optical axes of a laser diode and an optical waveguide in an optical switching element or an isolator, connection of optical fibers in an optical communication network system and alignment of optical axes of an optical lens system and a charge coupled device in a solid imaging device. These processes require exclusive assembly devices having a complicated actuator mechanism, special jigs and skillful workers having high technique for fully using these devices. After the above mentioned positional adjustment has been performed, the components are fixed in position by using instant adhesive, ultraviolet-curing adhesive or anaerobic adhesive.

Especially, in production of a video cassette recorder (VCR), it is quite important to accurately place a magnetic head on a rotary drum for the following reason. When the rotary drum is wrapped around with a magnetic tape in a oblique manner, a magnetization pattern (recording track) to be recorded and reproduced on the magnetic tape by the magnetic head mounted on an outer periphery of the rotary drum is determined. Namely, head-height on a periphery of the rotary drum determines pitch of the recording track.

FIG. 32 shows a known method of adjusting height of the magnetic head. Initially, a height from a reference surface (not shown) of a head chip 202 to the track is measured so as to determine thickness of a spacer (not shown) and then, rough adjustment is performed by inserting the spacer between an upper drum 201 and a base plate 203 having the head chip 202 attached thereto. Subsequently, height of the magnetic head is measured by using an objective lens 204 and an adjustment amount required for adjusting height of the magnetic head to a predetermined value is calculated. Thereafter, a miniature screw 205 in contact with a portion of the base plate 203 is screwed into the upper drum 201 through the necessary adjustment amount. As a result, height of the magnetic head is adjusted by partially deforming the base plate 203. This operation is repeated as required and finally, the miniature screw 205 is fixed in position by agent for preventing loosening of the miniature screw 205, for example, resin curing at ordinary temperature.

In the above known method, the base plate 203 is deformed within its elastic limit by thrust force of the miniature screw 205. In this case, there is such a risk that if screwed distance of the miniature screw 205 changes due to mechanical vibrations or temperature changes, amount of deformation of the base plate 203 changes accordingly, thereby resulting in change of height of the magnetic head.

In the actual video cassette recorder, there are various vibration sources such as rotation of the rotary drum and feed of the magnetic tape. In addition, height of the magnetic head changes on the order of several microns due to changes with time of heat produced from drive systems for the magnetic head and the magnetic tape or changes of environment for operating the video cassette recorder. In a system in which pitch of a recording track is not more than 10 μm, e.g., a digital video cassette recorder, even if changes of height of the magnetic head are on the order of several microns, an influence nonnegligible for reliability of the system is exerted upon the system.

The necessity that the troublesome attitudinal adjustment processes are performed at the time of mounting of the head chip 202 on the upper drum 201 as described above is largely attributable to the fact that positional accuracy of the head chip 202 based on the surface of the base plate 203 in contact with the upper drum 201 is not sufficiently high. Therefore, if positional accuracy of the head chip 202 is set on the order of submicrons, it becomes possible to operate the system by merely mounting the base plate 203 on the upper drum 201.

Meanwhile, recently, first and second methods in which thermal energy obtained by irradiating a laser beam is used for attitudinal adjustment of the magnetic head are proposed in, for example, Japanese Patent Laid-Open Publication Nos. 5-28446 (1993) and 5-334637 (1993). The first known method disclosed in the above former document is described with reference to FIGS. 33A and 33B. A magnetic head 211 includes a base plate 212 and a head chip 210 bonded to a projection 212a of the base plate 212. The base plate 212 is formed with a threaded hole 214 for securing the base plate 212 to a rotary drum. The projection 212a is formed with a hole 213 for passing a winding of the magnetic head 211 therethrough and an opening 215 for receiving the laser beam. Adjustment of height of the magnetic head 211 is performed by pouring thermal energy of the laser beam to the opening 215 formed between the hole 213 and the threaded hole 214. A YAG (yttrium aluminum garnet) laser is employed as the laser. The laser beam is converged onto a laser beam diameter of 600 μm at an output of 300 W so as to be irradiated to the opening 215 of the magnetic head 211 at several msec per pulse. Thus, thermal energy of the laser beam is irradiated to a bottom portion of the opening 215, which has a thickness equal to a difference between a thickness t of the base plate 212 and a depth d of the opening 215. When the depth t is so set as to be deeper than a half of the thickness t of the base plate 212, increase of amount of displacement of the base plate 212 is conspicuous.

The bottom portion of the opening 215 is subjected to thermal shrinkage. A surface 217 of the base plate 212, which is disposed at a periphery of the opening 215 and is placed on the rotary drum, does not receive energy from the laser and thus, is not displaced by force of thermal shrinkage. Therefore, when the laser beam is irradiated to the base plate 212, the base plate 212 is displaced in a direction opposite to that of irradiation of the laser beam. On the other hand, when the laser beam is irradiated to parallel regions 216 of the base plate 212, only the irradiated parallel regions 216 receive energy, so that the base plate 212 is displaced only in the direction of irradiation of the laser beam.

Thus, when the laser beam is irradiated to the base plate 212 made of brass or the like, the portion of the base plate 212, to which the laser beam has been irradiated, is molten so as to be distorted. As a result, the base plate 212 is bent minutely with the irradiated portion as its center so as to be displaced in a tracking direction.

Then, the second known method disclosed in the above second document is described with reference to FIG. 34. As shown in FIG. 34, a head chip 221 is bonded to a projection 222a of a base plate 222 made of brass. Two parallel grooves 223a and 223b are formed on the projection 222a. The parallel grooves 223a and 223b extend in a direction orthogonal to a radial direction of a rotary drum (not shown) on which the base plate 222 is mounted. Attitudinal adjustment of the head chip 221 is performed by irradiating a laser beam to a portion 224 of the projection 222a, which is disposed between the parallel grooves 223a and 223b. A YAG laser is employed as the laser and the laser beam is concentrated to a laser beam diameter of 200 μm.

In this second known method, since the laser beam is irradiated to only the portion 224 between the parallel grooves 223a and 223b, only the portion 224 of the base plate 222 is subjected to plastic deformation and thus, the base plate 222 is displaced in a direction of irradiation of the laser beam.

In the first and second known methods employing the laser beam, since amount of deformation of the base plate does not change due to mechanical vibrations or temperature changes, height of the magnetic head does not change. Meanwhile, it is possible to perform fine adjustment of amount of displacement of the base plate by controlling energy of the laser.

However, the above mentioned known methods employing the laser beam have the following drawbacks (1) to (4).

(1) Since displacement of the base plate due to its deformation through its thermal melting caused by irradiating the concentrated laser beam to the opening and the portion between the grooves, displacement of the base plate scatters according to position of irradiation of the laser beam, internal stress of the base plate, machining accuracy of the base plate, etc.

(2) At such a laser power as to thermally melt the base plate, a peripheral portion of the base plate is greatly affected by heat conduction. Therefore, even if position of the base plate is adjusted by irradiation of the laser beam, the base plate is displaced after heat dissipation by thermal expansion. Meanwhile, since a long period is required for heat dissipation of the base plate, total processing period is lengthened.

(3) Since distortion of the base plate is nonuniform, displacement modes of two and three dimensions overlap each other.

(4) The laser is required to have large power capable of thermally melting the base plate.

On the other hand, known attitudinal adjustment methods using a jig or an actuator have the following problems (1) to (3).

(1) In assembly using the jig or the like, since it becomes quite difficult to handle the jig as size of functional components becomes smaller and thus, accuracy of assembly cannot be secured.

(2) In assembly using a device having the actuator mechanism, since drive systems for a linear stage, a rotary stage, etc. equal, in number, to degrees of freedom for independent adjustment are required to be provided and the device should be designed to high rigidity so as to prevent interference among relative movement of the stages, the apparatus is made larger and more expensive. Meanwhile, in the same manner as the jig, when the components to be mounted are small or fragile, it is difficult to perform automatic assembly of the components by using the device, the number of degrees of freedom is reduced, setting of accuracy specification is restricted or fraction defective at accuracy inspection rises undesirably. Moreover, in case handling of the components is automated, yield may drop due to damage to the components at the time of chucking by impact force applied during adjustment.

(3) Since the components are finally fixed in position by resin, attitude of the components changes upon curing shrinkage of resin. Thus, even if attitudinal adjustment of the components can be performed at an accuracy of submicrons, magnitude and scatter of amount of attitudinal changes of the components due to curing shrinkage of resin should be take into consideration at the time of accuracy design. As a result, final accuracy gained in practical use remains at several microns at best.

Especially, in the case where the former known methods employing the laser beam is used for positional adjustment of the magnetic head in the VCR, distortion of the magnetic head causes displacement of the magnetic head not only in a tracking direction but in azimuthal direction and flapping direction. Meanwhile, displacements in these directions are different from each other. Therefore, such a case may happen in which even if height of the track has been adjusted to a predetermined position, azimuth and flapping are not disposed at predetermined positions. If the laser beams is further irradiated to the magnetic head so as to adjust azimuth to the predetermined position, height of the track and flapping may not be disposed at the predetermined positions. Thus, since it is extremely difficult to adjust all of height of the track, azimuth and flapping to the predetermined positions, maximum potential of the magnetic head cannot be extracted. Accordingly, since it is necessary to consider output loss due to misalignment of the magnetic head, the magnetic head is required to have output higher by the loss. Especially, in a digital VCR, since the track is required to have a pitch of 10 μm or less, even positional error on the order of microns affects electromagnetic conversion characteristics or signal processing on the system greatly. Furthermore, in case the magnetic head is deformed by thermally melting the magnetic head by the laser beam, a long period is required for heat dissipation and thus, it is difficult to shorten processing period required for positional adjustment.

Meanwhile, in the known method shown in FIG. 34, since the laser beam is irradiated to the portion between the parallel grooves, amounts of displacement of the magnetic head in azimuthal direction and flapping direction can be reduced slightly as compared with those of the known method of FIGS. 33A and 33B but are not sufficiently small. Meanwhile, if the base plate has been deformed beyond a necessary amount of displacement, the laser beam should be irradiated from the back face of the base plate. In this case, it is necessary to either provide two lasers or irradiate the laser beam by overturning the upper drum, so that attitudinal adjustment of the magnetic head cannot be performed during rotation of the rotary drum. Moreover, in the rotary drum assembly required to be rotated at high speed, if fluid bearings are used for bearings of the rotary drum, position of the upper drum relative to a lower drum changes greatly according to whether or not a shaft is rotating. Therefore, in the known method of FIG. 34 in which attitudinal adjustment of the magnetic head should be performed in a rest state, it is difficult to secure sufficiently high accuracy and thus, attitudinal adjustment of the magnetic head is forced to be based on trial and error.

Meanwhile, in the known methods, even if the head chip is secured to the base plate at high accuracy through positional adjustment, attitude of the head chip changes through curing shrinkage of resin as long as the resin is used for securing the head chip to the base plate. Amount of this change of attitude of the head chip depends upon amount of the resin but usually ranges from several microns to about 10 microns. For this reason, a magnetic head has not been so far available in which the head chip is set to the base plate at a predetermined position at an accuracy of submicrons and which can be mounted on the rotary drum without its attitudinal adjustment.

Meanwhile, the present invention also relates to a positional adjustment method of adjusting an optical axis of an objective lens relative to an optical axis from a light source. More specifically, the present invention relates to a positional adjustment method for an objective lens, in which an optical axis of the objective lens provided in an optical pickup for recording, reproducing and erasing information on an optical disk by irradiating a laser beam to the optical disk can be made parallel to an optical axis of a laser beam source by adjusting inclination of the objective lens relative to the optical axis of the laser beam source. Furthermore, the present invention relates to a positional adjustment method for an objective lens, in which height of the objective lens (position of the objective lens in the optical axis) also can be adjusted such that assembly error of an actuator of the optical pickup in a focusing direction can be absorbed.

FIG. 35 shows a prior art magneto-optical disc apparatus. In this prior art magneto-optical apparatus, a magneto-optical disc 151 is driven for rotation by a motor 152. A laser beam 157 emitted from a laser beam source 153a is reflected by a mirror 153b and then, is converged, through an objective lens 156, onto a surface of a disc recording medium 151a incorporated in the magneto-optical disc 151 so as to record, reproduce or erase information on the disc recording medium 151a. An objective lens actuator 154 displaces the objective lens 156 in a focusing direction and a radial direction of the magneto-optical disc 151 so as to control the objective lens 156 such that a converged position of the laser beam 157 on the surface of the disc recording medium 151a follows a recording track of the disc recording medium 151a. A housing 153 accommodates an optical system of the laser beam source 153a, the mirror 153b, etc. An optical pickup (optical head) is composed by the housing 153 and the objective lens actuator 154. Meanwhile, an electromagnet coil 155 is used to generate magnetic field for recording and erasing information.

In the prior art magneto-optical disc apparatus, when the objective lens 156 is mounted obliquely relative to an optical axis 157a, aberration is produced in the laser beam 157 proceeding towards the magneto-optical disc 151 from the objective lens 156. As a result, the laser beam 157 is not converged sufficiently and thus, crosstalk happens between information on neighboring tracks.

Conventionally, in order to solve the above described problem, a spacer 158 is provided between the objective lens actuator 154 and the housing 153 so as to prevent the objective lens 156 from being inclined relative to the optical axis 157a.

FIGS. 36A and 36B show another prior art magneto-optical disc apparatus. In this prior art magneto-optical disc apparatus, a spherical recess 169a is formed on an upper face of a housing 163 and a spherical projection 169b is provided at a bottom portion of an objective lens actuator 164. Two coiled springs 171 are, respectively, provided between a screw 170a and the objective lens actuator 164 and between a screw 170b and the objective lens actuator 164, while two fixed screws 170c and 170d are fastened fully such that an objective lens 166 is not inclined relative to an optical axis from a light source. Meanwhile, instead of fully fastening the screws 170c and 170d, adhesive may also be applied to the spherical recess 169a.

In still another prior art magneto-optical disc apparatus different from the above two prior art magneto-optical disc apparatuses in which inclination of the objective lens actuator as a whole is adjusted, angle of inclination of the objective lens itself is adjusted by an angular adjustment device and then, the objective lens is fixed in position by bonding as disclosed in, for example, Japanese Patent Laid-Open Publication No. 4-113521 (1992).

However, when inclination of the objective lens 156 of the prior art magneto-optical disc apparatus of FIG. 35 is adjusted, operation of measuring inclination of the objective lens 156 and operation of inclining the objective lens 156 cannot be performed concurrently, so that adjustment of inclination of the objective lens 156 is troublesome undesirably. Meanwhile, operation of inserting the spacer 158 between the objective lens actuator 154 and the housing 153 requires repeated fastening and loosening of the screws and therefore, is time-consuming.

Meanwhile, when inclination of the objective lens 166 of the prior art magneto-optical disc apparatus shown in FIGS. 36A and 36B is adjusted, the spherical recess 169a occupies large space, so that a height 172 should be provided and thus, it is difficult to reduce thickness of an apparatus for adjusting inclination of the objective lens 166.

Furthermore, in the prior art magneto-optical disc apparatus disclosed in Japanese Patent Laid-Open Publication No. 4-113521 (1992), since the objective lens itself is tilted by the angular adjustment device, a support structure for supporting the objective lens is movable. Therefore, since the support structure is readily displaced by even slight external force, the beam spot under observation moves accordingly and thus, it is difficult to perform measurement.

Meanwhile, movable range of the objective lens actuator in the focusing direction (vertical direction) is mainly determined by facial runout of the magneto-optical disc and assembly error of the objective lens actuator, the pickup, etc. in the focusing direction. Therefore, when height of the objective lens is adjusted and the above mentioned assembly error is eliminated, movable range of the objective lens actuator in the focusing direction can be lessened and thus, the objective lens actuator can be made compact. Accordingly, from a standpoint of thickness of the magneto-optical disc apparatus, the magneto-optical disc apparatus can be made smaller in size.

In order to make the prior art magneto-optical disc apparatuses of FIG. 35 and FIGS. 36A and 36B more compact, a mechanism for adjusting height of the objective lens should be provided in addition to a mechanism for adjusting inclination of the objective lens. Namely, height of a reference surface of a turntable on a spindle motor for mounting the disc thereon and position of a focal point of the objective lens are measured so as to obtain the assembly error of the objective lens actuator, the pickup, etc. Thus, in the prior art magneto-optical disc apparatus of FIG. 35, a spacer having a thickness equal to the assembly error is placed under the spindle motor. Meanwhile, in the prior art magneto-optical disc apparatus of FIGS. 36A and 36B, a mechanism for adjusting height of the turntable by using screws is provided on a mount portion of the spindle motor so as to absorb the assembly error.

However, in the prior art magneto-optical disc apparatus of FIG. 35, since operation of providing the spacer requires repeated fastening and loosening of the screws and thus, is time-consuming. Meanwhile, in the prior art magneto-optical disc apparatus of FIGS. 36A and 36B in which height of the spindle motor is adjusted by using the screws, only the spindle motor having a special construction in which a motor shaft is brought into metallic contact with a base, etc. can be employed, thereby resulting in narrow applications. Moreover, adjustment using the screws is not suitable for automation. Meanwhile, in case the objective lens is fixed in position by resin after positional adjustment of the objective lens, attitude of the objective lens changes through curing shrinkage of the resin, thus resulting in deterioration of accuracy of positional adjustment of the objective lens.

SUMMARY OF THE INVENTION

Accordingly, a first object of the present invention is to provide a method of adjusting position of a member and the member subjected to positional adjustment, in which positional adjustment of the member can be performed more rapidly at higher accuracy and can be set in a desired direction.

A second object of the present invention is to provide a method of adjusting position of an objective lens, in which positional adjustment of the objective lens can be performed easily at high accuracy in a shorted period and which can make an adjustment device more compact in size and has wide applications.

In order to accomplish the first object of the present invention, a method of adjusting position of a member including an adjustable portion made of material having shape memory effect, in one aspect of the present invention comprises the steps of: heat-treating for shape memory the member in a first shape such that the first shape is memorized in the adjustable portion; plastically deforming the adjustable portion to a second shape after cooling the adjustable portion to less than a shape recovery temperature; and locally heating the adjustable portion to more than the shape recovery temperature so as to subject the adjustable portion to local shape recovery.

The method of adjusting position of the member, according to the present invention is based on such a basic principle that the first shape is memorized in the adjustable portion made of shape memory material, the adjustable portion is plastically deformed to the second shape and then, the adjustable portion is locally heated to more than the shape recovery temperature so as to be subjected to local shape recovery such that the member is deformed by interaction between a portion subjected to shape recovery and a portion subjected to plastic deformation. Therefore, if a functional component is attached to the member, the functional component can be adjusted to an intermediate position or attitude between the first and second shapes.

Shape memory material has a property to be recovered to an original shape in shape memory when heated to more than the shape recovery temperature even if shape memory material is plastically deformed within a certain limit at less than the shape recovery temperature after having been subjected to a shape memory processing.

The present invention partially utilizes shape recovery force of shape recovery material by local heating. The present invention has a basic concept that fine adjustment of the member is performed by utilizing plastic deformation and shape recovery force based on local heating. Therefore, if a functional component is attached to the member, attitude of the functional component can be adjusted. Hereinafter, this concept is described in detail.

For example, in metal, shape memory effect is a phenomenon which occurs in connection with so-called "thermoelastic" type martensitic transformation. Meanwhile, martensitic transformation is a kind of phase transformation in which crystal structure changes in solid phase and is phase change which happens in a manner similar to that of shearing strain through linking among atoms without diffusion of atoms over a long distance. Temperature at which phase transformation happens is referred to as "transformation temperature" or "transformation point". A state higher than the transformation point is referred to as "austenitic phase" or "parent phase", while a state lower than the transformation point is referred to as "martensitic phase". Since crystal structure of alloy in austenitic phase is different from that in martensitic phase, properties of alloy in austenitic phase are variously different from those in martensitic phase. When shape memory alloy set in austenitic phase at high temperature is cooled, the shape memory alloy is subjected to martensitic transformation so as to be converted into martensitic phase. On the contrary, when the shape memory alloy in martensitic phase is heated, the shape memory alloy is subjected to reverse martensitic transformation so as to be converted into austenitic phase.

Conventionally, phase change of shape memory alloy has been generally utilized in which even if the shape memory alloy is subjected to plastic deformation at less than a temperature at which martensitic transformation finishes (hereinafter, referred to as "Mf point"), the shape memory alloy recovers to its original shape when the shape memory alloy as a whole is heated to a temperature at which reverse martensitic transformation is completed (hereinafter, referred to as "Af point"). Alternatively, as in spectacle frames and antennas for mobile phones, property of super elasticity of shape memory alloy in austenitic phase has been generally employed that the shape memory alloy is turned to it original shape promptly even if the shape memory alloy is deformed.

On the other hand, the present invention employs new shape memory effect as described above. FIG. 26 shows a basic concept of the method of adjusting position of the member, according to the present invention. As shown in FIG. 26, (A) the adjustable portion of the member is as a whole heat-treated for shape memory initially such that the predetermined first shape is memorized and then, (B) the adjustable portion as a whole is set to less than the Mf point and is subjected to desired plastic deformation. Thereafter, (C) when the adjustable portion is locally heated by, for example, irradiating a laser beam thereto so as to be partially set to higher than the Af point, a part of the adjustable portion is set to austenitic phase through reverse martensitic transformation. As a result, (D) the part of the adjustable portion, which has been heated to more than the Af point, is turned to the original first shape. Subsequently, when the adjustable portion including the heated part is as a whole set to less than the Mf point by interrupting local heating of the adjustable portion through, for example, irradiation of the laser beam, the adjustable portion as a whole is again set to martensitic phase. At this time, stress is newly produced at a boundary between the part whose shape is recovered and the plastically deformed part. By this internal residual stress, the adjustable portion is minutely displaced relative to the plastically deformed shape (second shape).

From this basic principle, the present inventors have obtained the following concept of an attitudinal adjustment mechanism. Namely, to be able to control volume of the local heating portion (shape recovery portion) relative to the whole material means directly that the whole material can be arbitrarily set to a shape between the plastically deformed shape (second shape) and the initially memorized shape (first shape). In other words, only if a functional component is preliminarily fixed to the shape memory material by resin, the functional component can be adjusted to a desired attitude on the basis of the basic concept.

Meanwhile, in the present invention, since attitudinal adjustment of the member can be performed by heating the member to one hundred and several tens degrees celsius at most, attitudinal adjustment of the member can be performed at less power than known attitudinal adjustment in which a base plate having a functional component mounted thereon is thermally molten by irradiating a laser beam thereto. Therefore, in the present invention, since period for heat dissipation and processing period can be shortened and a positional adjustment apparatus can be simplified structurally in comparison with prior art. Accordingly, in the present invention, since necessary electric power is saved and safety is improved, the present invention is quite superior to prior art from a standpoint of production technique.

As described above, the most remarkable features of the present invention reside in that since minute displacement of the member based on local phase change of the member is utilized, attitude of the member can be adjusted on the order of submicrons and that once attitude of the member is fixed, attitude of the member can be maintained stably through substantial elimination of changes of the attitude with time such as strain relaxation due to aging.

In the case of known fixing of the functional component by the use of resin, change of attitude due to curing shrinkage of resin poses a problem. However, in the present invention in which shape memory effect is used for attitudinal adjustment, such problem of prior art can be eliminated completely. As far as the basic principle of the present invention is adopted, rough adjustment and fine adjustment of attitude of the functional component, e.g., a magnetic head chip can be performed by controlling ratio of the portion subjected to reverse martensitic transformation to the portion subjected to plastic deformation. Especially, in case a laser is used as a means for performing local heating, it is needless to say that attitudinal adjustment of the functional component can be performed more easily by controlling area for irradiating a laser beam.

Meanwhile, in order to accomplish the second object of the present invention, a method of adjusting position of an objective lens by adjusting an optical axis of the objective lens relative to an optical axis from a light source, in another aspect of the present invention comprises the steps of: providing between the objective lens and an objective lens holder for holding the objective lens, a support member made of material having shape memory effect such that the objective lens is supported relative to the objective lens holder by the support member; and locally heating the support member to more than a shape recovery temperature so as to subject the support member to local shape recovery such that the support member is deformed by an internal stress produced in the support member.

In this method of the present invention, the support member for supporting the objective lens is made of shape memory material partially or wholly. Meanwhile, the objective lens is supported at not less than three locations by the support member. When a spot of the support member is heated to more than a shape recovery temperature, the support member is displaced. As a result, since height of support point for the objective lens provided on the support member changes, height of the objective lens can be set such that not only the objective lens is inclined so as to make the optical axis of the objective lens coincident with the optical axis from the light source but assembly error of an actuator, a pickup, etc. in a focusing direction can be absorbed.

BRIEF DESCRIPTION OF THE DRAWINGS

These objects and features of the present invention will become apparent from the following description taken in conjunction with the preferred embodiments thereof with reference to the accompanying drawings, in which:

FIG. 7 is a perspective view showing a magnetic head chip attached to a base plate used in a method of adjusting position of a magnetic head, according to a third embodiment of the present invention;

FIG. 8A is a perspective view of shape of shape memory of the base plate of FIG. 7;

FIG. 8B is a perspective view of shape of plastic deformation of the base plate of FIG. 7;

11

Figure 13A:
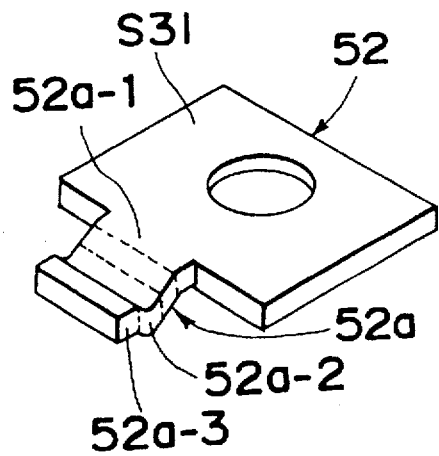
Figure 13B:
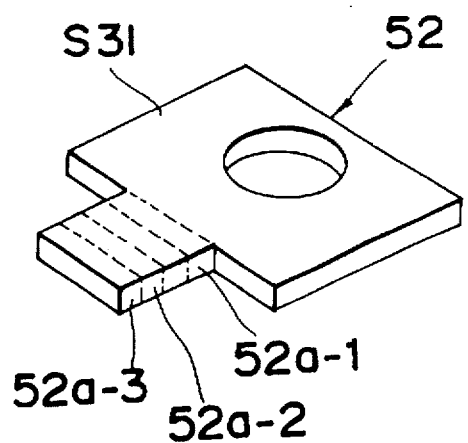
Figure 14A:
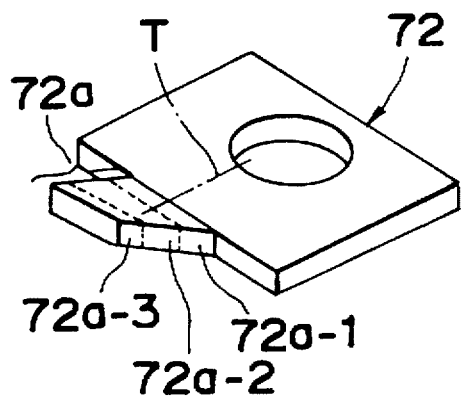
Figure 14B:
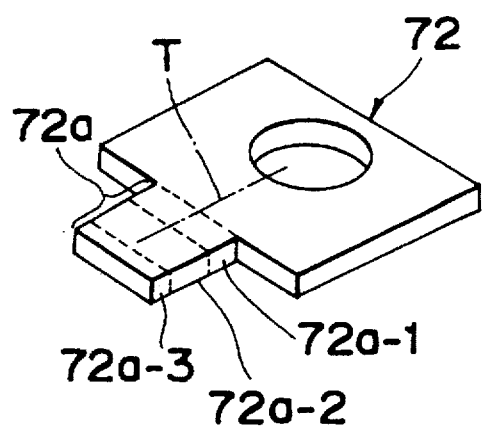
Figure 15A:
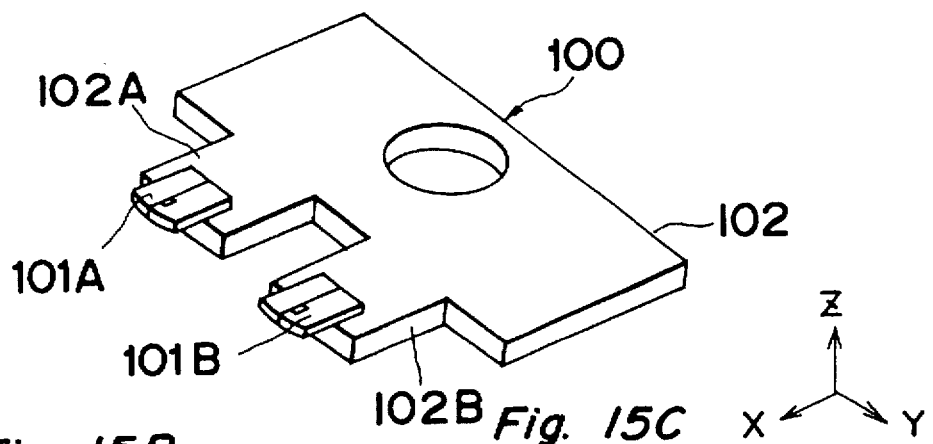
Figures 15B, 15C:
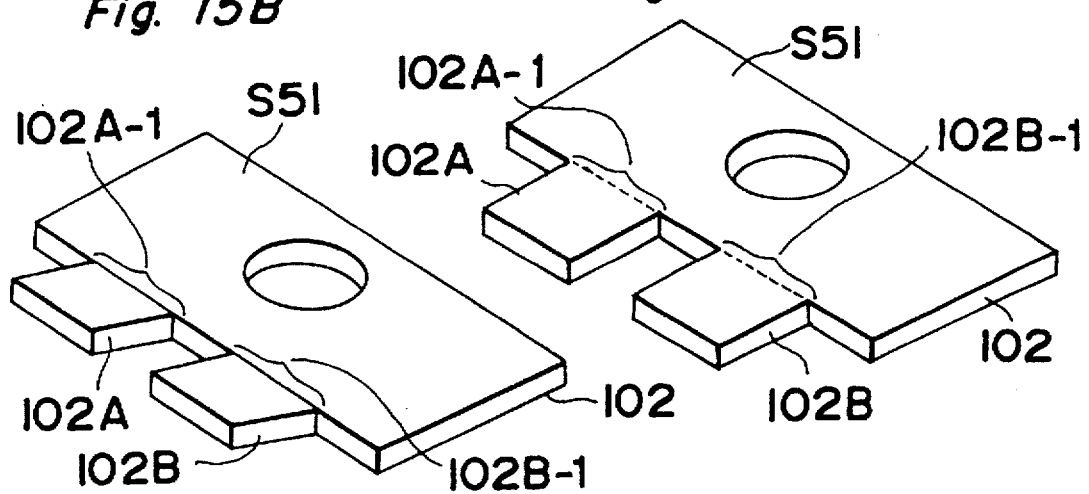
Figures 19A, 19B:
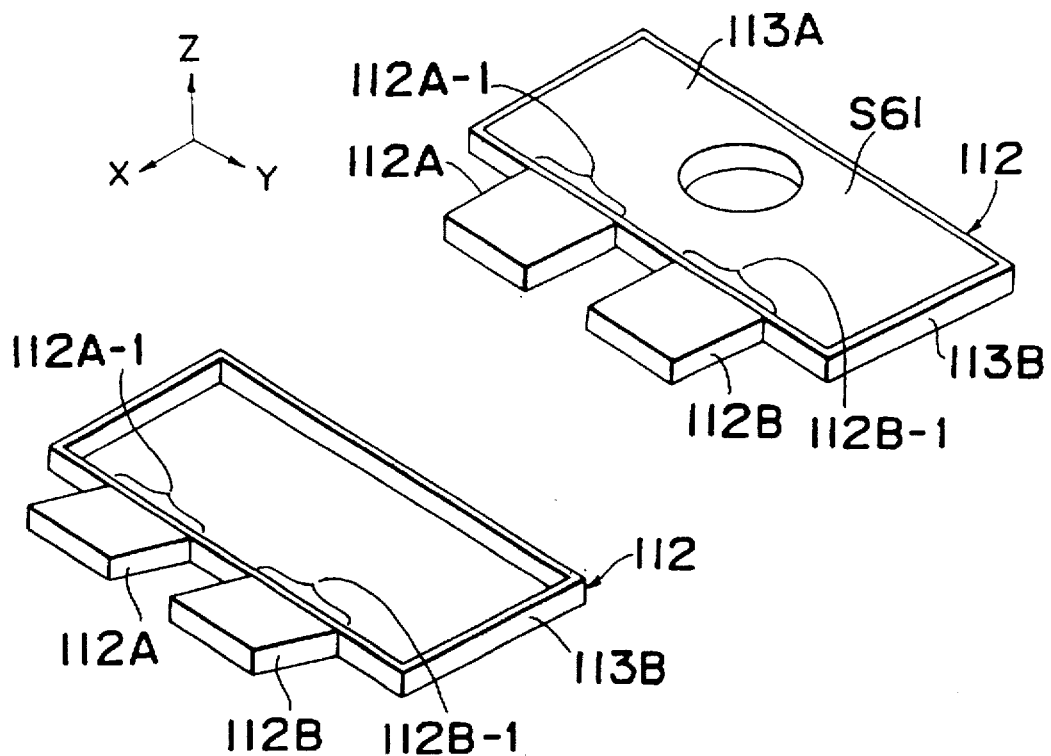
Figure 20:
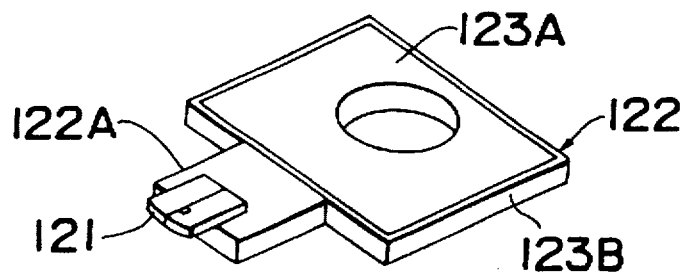
Figure 21A:
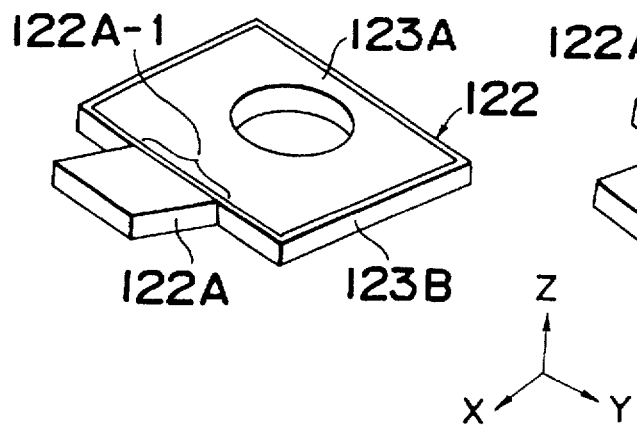
Figure 21B:
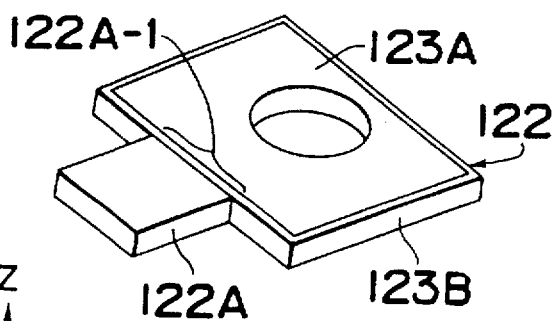
Figure 22A:
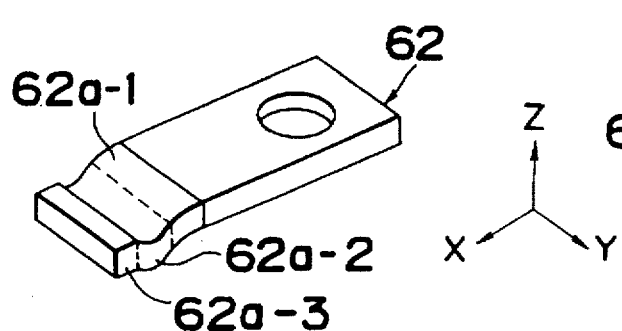
Figure 22B:
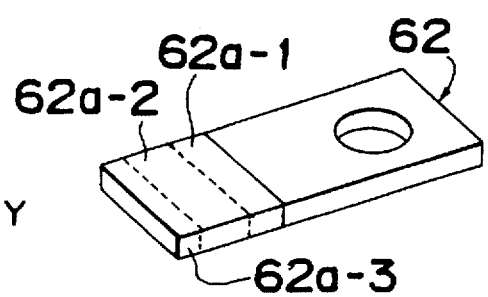
Figure 23A:
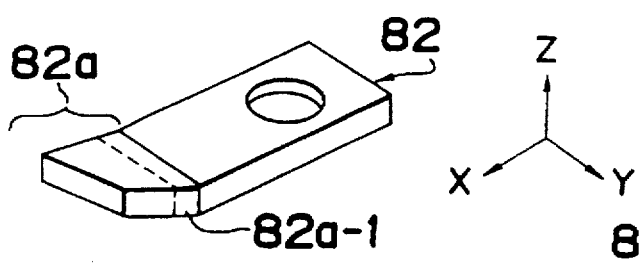
Figure 23B:
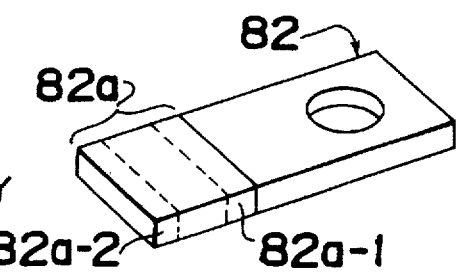
Figure 24:
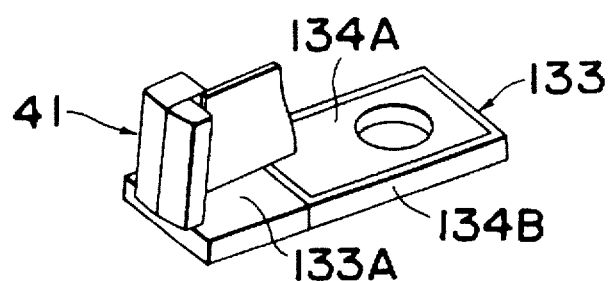
Figure 25A:
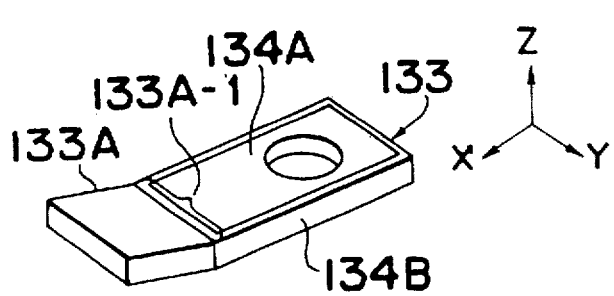
Figure 25B:
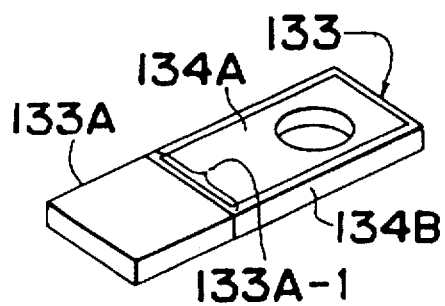
Figure 26:
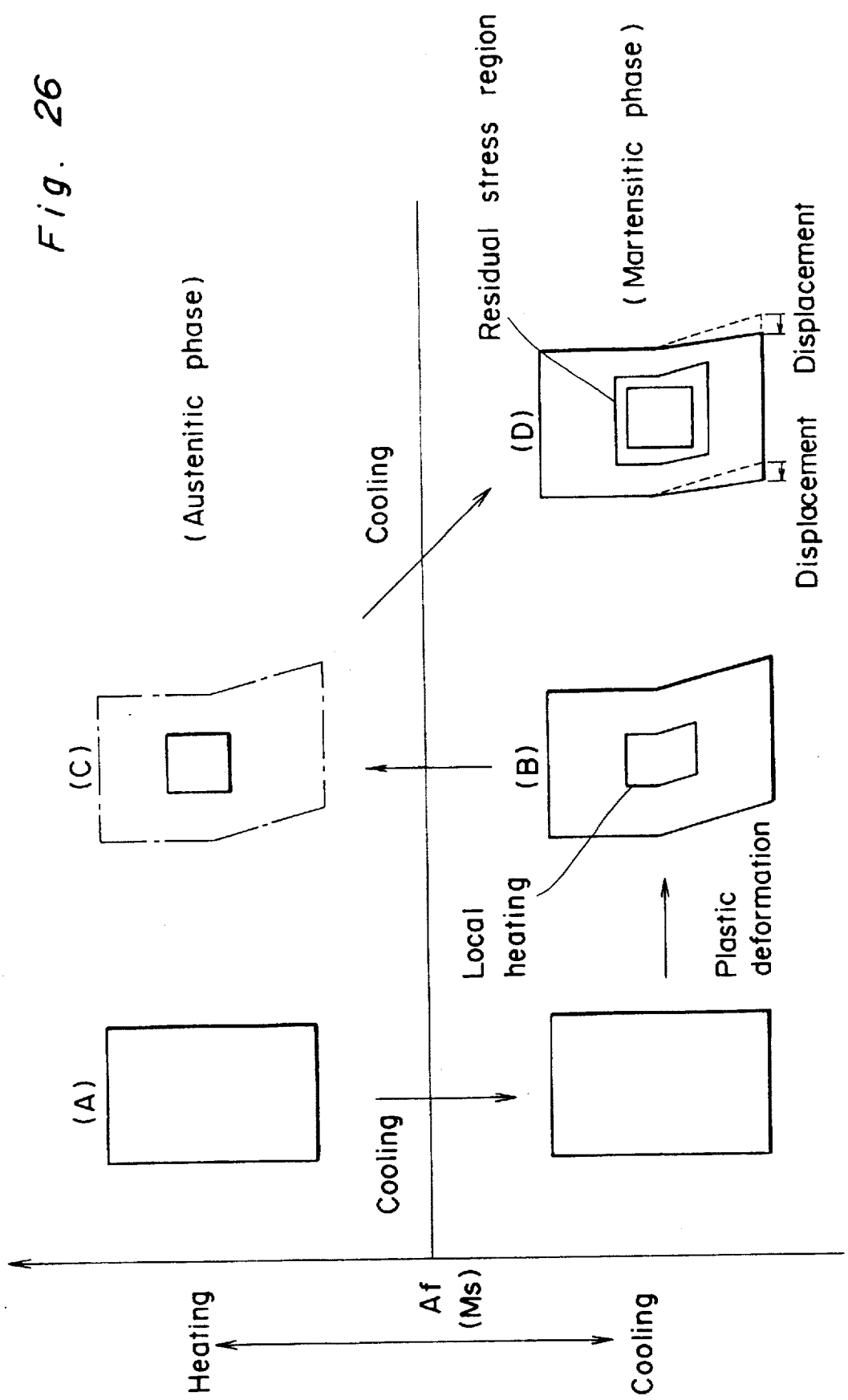
Figure 28:
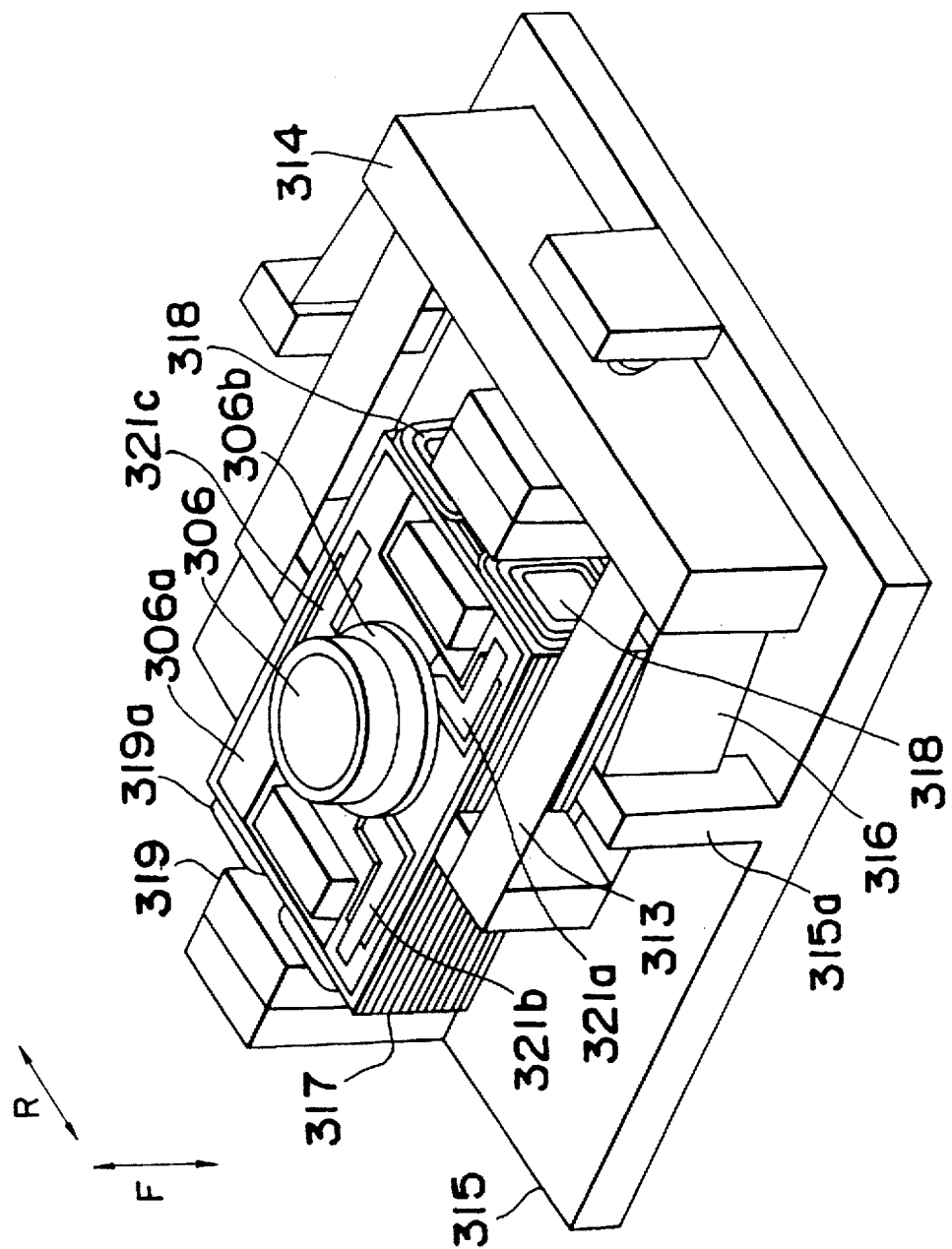
Figure 30A:
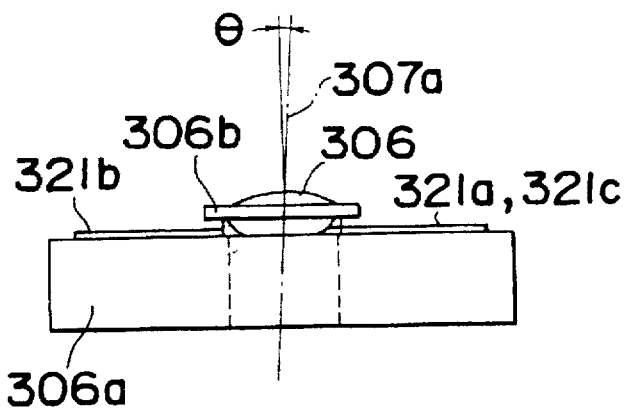
Figure 30B:
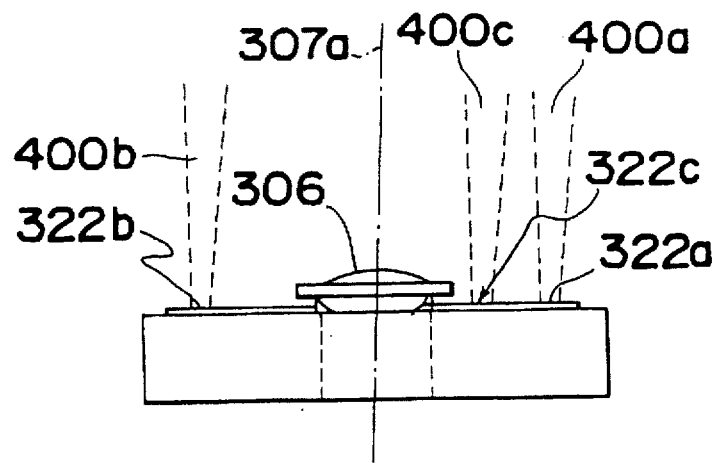
Figure 30C:
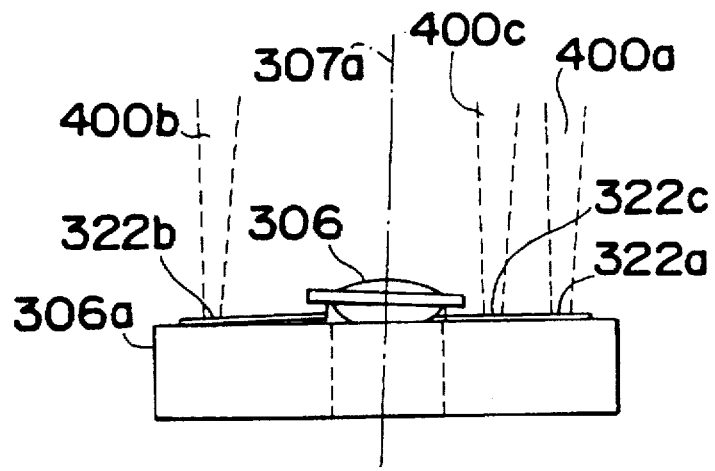
Figure 31A:
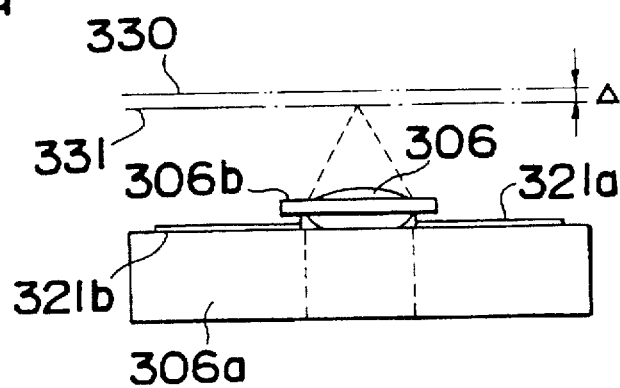
Figure 31B:
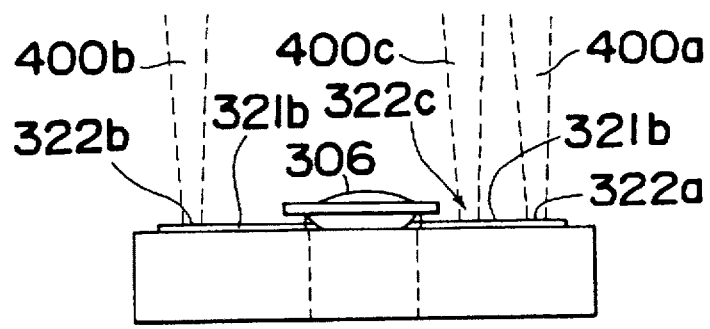
Figure 31C:
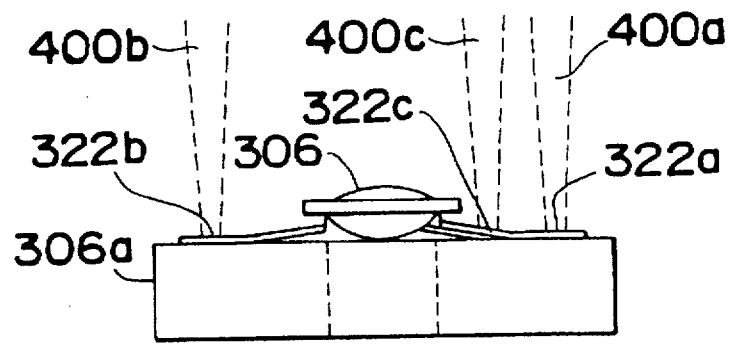
Figure 32:
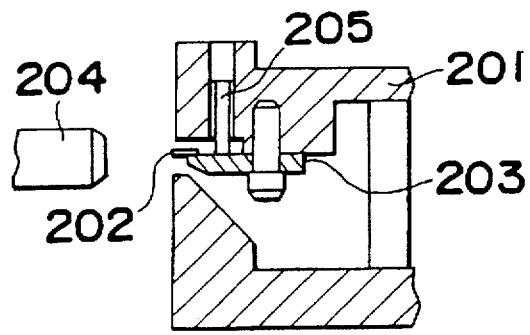
Figure 33A:
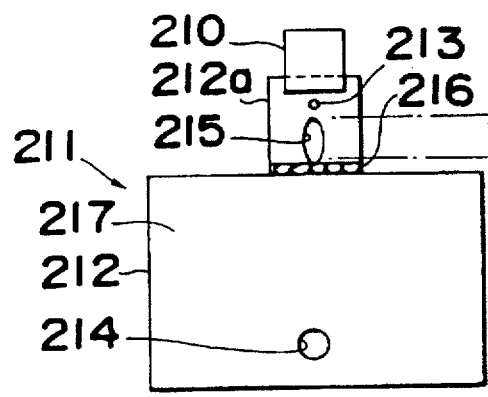
Figure 33B:
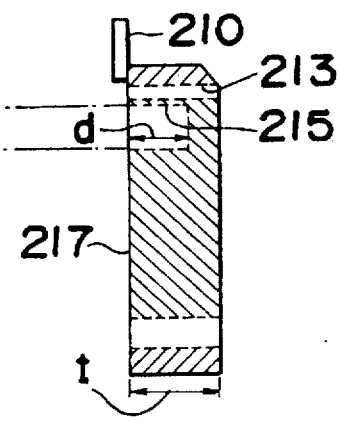
Figure 34:
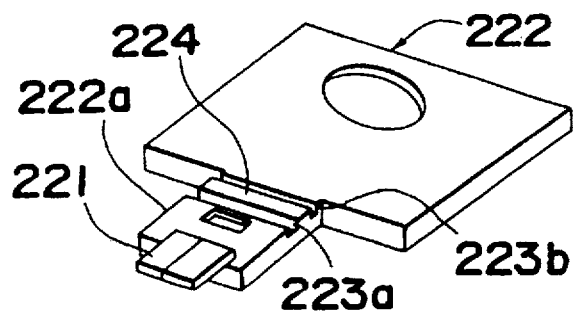
Figure 35:
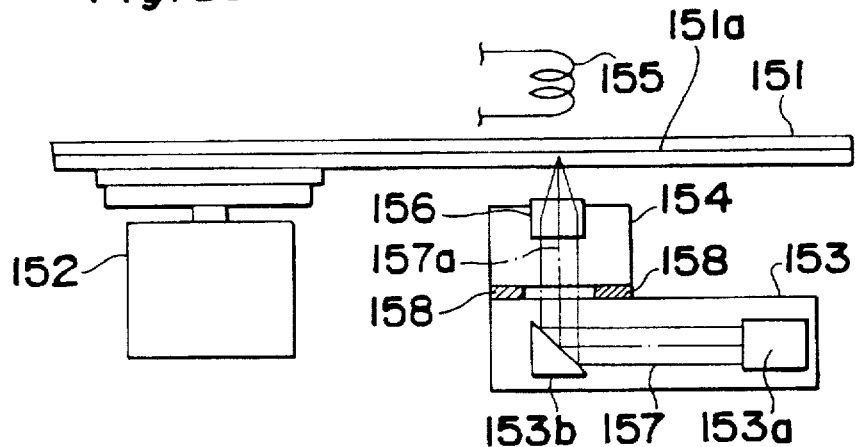
Figure 36A:
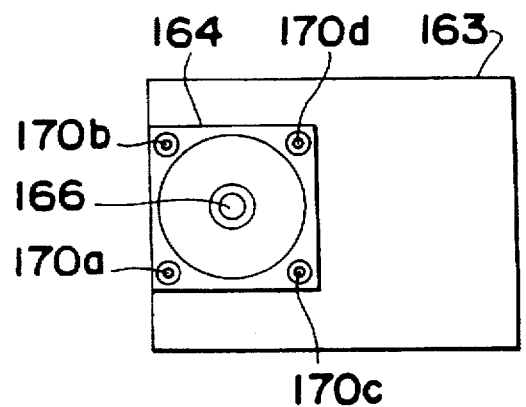
Figure 36B:
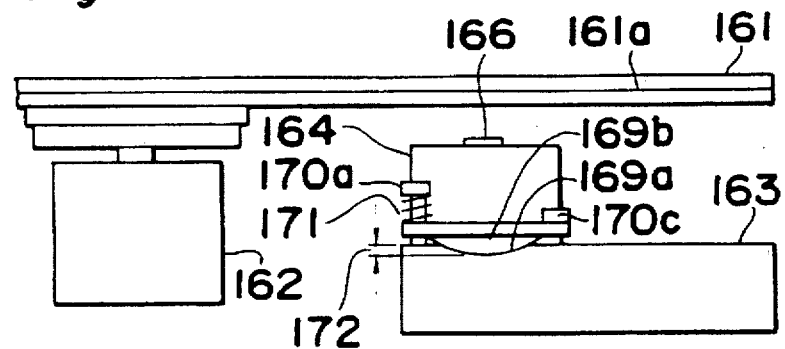

FIG. 13A is a perspective view of shape of shape memory of a base plate used in a method of adjusting position of a magnetic head, according to a fourth embodiment of the present invention;

FIG. 13B is a perspective view of shape of plastic deformation of the base plate of FIG. 10A;

FIG. 14A is a perspective view of torsional shape of shape memory of a base plate used in a method of adjusting position of a magnetic head, according to a fifth embodiment of the present invention;

FIG. 14B is a perspective view of flat shape of plastic deformation of the base plate of FIG. 14A;

FIG. 15A is a perspective view of a magnetic head having a pair of magnetic head chips used in a method of adjusting position of the magnetic head, according to a sixth embodiment of the present invention;

FIG. 15B is a a perspective view of shape of memory shape of a base plate of the magnetic head of FIG. 15A;

FIG. 15C is a perspective view of shape of plastic deformation of the base plate of FIG. 15B;

FIG. 16A is a view showing a state in which two magnetic heads are mounted on a rotary drum;

FIG. 16B is a perspective view of a magnetic head having a pair of magnetic head chips;

FIG. 16C is a view showing a state in which the magnetic head is mounted on the rotary drum;

FIG. 17 is a view showing a state in which local heating of the magnetic head of FIG. 15A is performed by using a laser beam;

FIG. 18 is a perspective view of a magnetic head including a resinous portion used in a method of adjusting position of the magnetic head, according to a seventh embodiment of the present invention;

FIG. 19A is a perspective view of shape of memory shape of a base plate of the magnetic head of FIG. 18;

FIG. 19B is a perspective view of shape of plastic deformation of the base plate of FIG. 19A;

FIG. 20 is a perspective view of a magnetic head used in a modification of the method of FIG. 18;

FIG. 21A is a perspective view of shape of shape memory of a base plate of the magnetic head of FIG. 20;

FIG. 21B is a perspective view of shape of plastic deformation of the base plate of FIG. 21A;

FIG. 22A is a perspective view of shape of a base plate used in a modification of the fourth embodiment;

FIG. 22B is a perspective view of shape of plastic deformation of the base plate of FIG. 22A;

FIGS. 23A and 23B are perspective views showing first and second shapes of a base plate used in a modification of the fifth embodiment, respectively;

FIG. 24 is a perspective view of a stationary multichannel magnetic head used in another modification of the seventh embodiment;

FIG. 25A is a perspective view of shape of shape memory of a base plate of the magnetic head of FIG. 24;

FIG. 25B is a perspective view of shape of plastic deformation of the base plate of FIG. 25A;

FIG. 26 is a conceptional view explanatory of basic principle of the method of the present invention;

FIGS. 27A, 27B, 27C, 27D and 27E are views showing basic steps common in the methods of the third to seventh embodiments;

FIG. 28 is a perspective view of an objective lens actuator used in a method of adjusting position of an objective lens, according to one embodiment of another aspect of the present invention;

FIG. 29A is a top plan view of an objective lens assembly employed in the objective lens actuator of FIG. 28;

FIG. 29B is a side elevational view of the objective lens assembly of FIG. 29A;

FIG. 29C is a sectional view taken along the line XXIXC—XXIXC in FIG. 29A;

FIG. 29D is a perspective view of shape of shape memory of a support member of the objective lens assembly of FIG. 29A;

FIG. 29E is a perspective view of shape of plastic deformation of the support member of FIG. 29D;

FIG. 30A is a view showing a state in which an optical axis of the objective lens of FIG. 28 is inclined relative to an optical axis of a light source;

FIG. 30B is a view showing a state in which a laser beam is irradiated to the support member of FIG. 29D;

FIG. 30C is a view showing a state in which the optical axis of the objective lens of FIG. 28 coincides with the optical axis of the light source;

FIG. 31A is a view showing a state in which the objective lens of FIG. 28 is lower by an amount Δ than a predetermined position;

FIG. 31B is a view showing a state in which a laser beam is irradiated to the support member of FIG. 29D;

FIG. 31C is a view showing a state in which height of the objective lens of FIG. 28 reaches the predetermined position of FIG. 31A;

FIG. 32 is a sectional view explanatory of a prior art positional adjustment method employing a miniature screw;

FIGS. 33A and 33B are a top plan view and a sectional view explanatory of another prior art positional adjustment method utilizing melting based on a laser beam, respectively;

FIG. 34 is a perspective view explanatory of still another prior art positional adjustment method utilizing melting based on a laser beam;

FIG. 35 is a side elevational view of a prior art magneto-optical disc apparatus;

FIG. 36A is a top plan view of an objective lens actuator of another prior art magneto-optical disc apparatus; and FIG. 36B is a side elevational view of the prior art magneto-optical disc apparatus of FIG. 36A.

Before the description of the present invention proceeds, it is to be noted that like parts are designated by like reference numerals throughout several views of the accompanying drawings.

DETAILED DESCRIPTION OF THE INVENTION

Hereinafter, a method of adjusting position of a member, according to a first embodiment of one aspect of the present invention is described. In the method, a flat plate 1 shown in FIG. 1B is used as the member. The flat plate 1 is made of Ni—Ti alloy and has a length of 25 mm, a width of 6 mm and a thickness of 0.5 mm. In Ni—Ti alloy, Af point at which reverse transformation from martensitic phase to austenitic phase is completed is 80° C. and represents a shape recovery temperature.

In the method, the flat plate 1 is held at a heat treatment temperature for shape memory for about 1 h, such that flat shape is memorized as a first shape in the flat plate 1. The heat treatment temperature for shape memory usually ranges from 400° C. to 900° C. Since it has been found that a temperature of 500° to 600° C. is optimum for heat treatment in air due to influence of an oxide layer, heat treatment for shape memory is performed at a temperature of 500° to 600° C. in this embodiment.

Figure 1A:
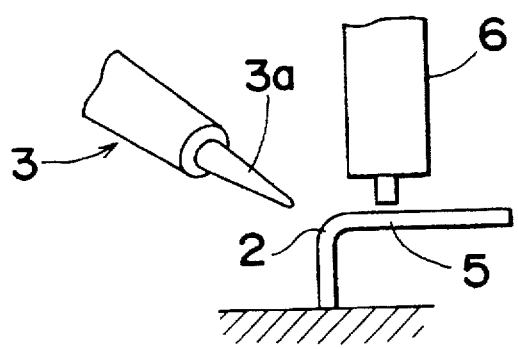
FIG. 1A is a schematic view explanatory of a method of adjusting position of a member, according to a first embodiment of one aspect of the present invention.
Figure 1B:
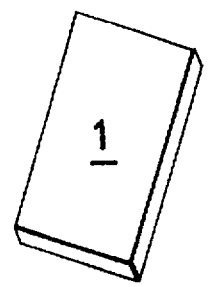
FIG. 1B is a perspective view of shape of shape memory of the member of FIG. 1A.

Subsequently, the flat plate 1 is cooled to a temperature which is lower than not only the shape recovery temperature but a martensitic transformation point and then, the flat plate 1 is bent substantially orthogonally at an adjustable portion 2 as shown in FIG. 1A so as to undergo plastic deformation to a second shape.

Then, by using a heating tool 3 having a sharp conical distal end portion 3a as shown in FIG. 1A, the distal end portion 3a heated to 250° C. is locally brought into contact with the adjustable portion 2 for 0.5 sec. and thus, temperature of the adjustable portion 2 is locally set higher than the shape recovery temperature.

Figure 2:
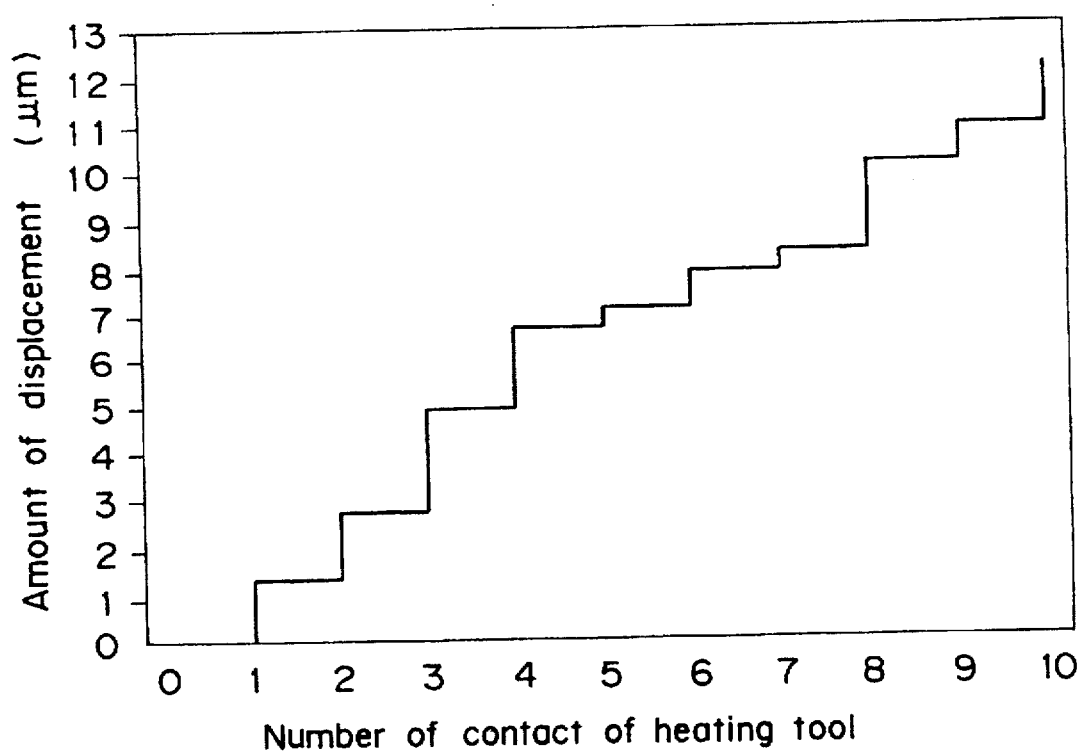
FIG. 2 is a graph showing relation between the number of contact of a heating tool and amount of displacement of the member of FIG. 1B.

FIG. 2 shows relation between the number of contact of the distal end portion 3a of the heating tool 3 with the adjustable portion 2 and amount of displacement of the flat plate 1 in μm. As shown in FIG. 1A, amount of displacement of the flat plate 1 is measured by using a minute displacement meter 6 confronting a portion 5 of the flat plate 1, which is spaced about 10 mm from the adjustable portion 2. As shown in FIG. 2, by changing the number of contact of the distal end portion 3a with the adjustable portion 2, displacement of the portion 5 can be controlled on the order of microns and degree of shape recovery of the adjustable portion 2 can be controlled minutely.

Meanwhile, if temperature of the distal end portion 3a of the heating tool 3 and period of contact of the distal end portion 3a with the adjustable portion 2 are controlled subtly, displacement adjustment on the order of even submicrons can be performed. Therefore, if the flat plate (base plate) 1 is made of shape memory material and a functional component is fixed to the flat plate 1, attitude (position) of the functional component can be adjusted accurately.

Figure 3:
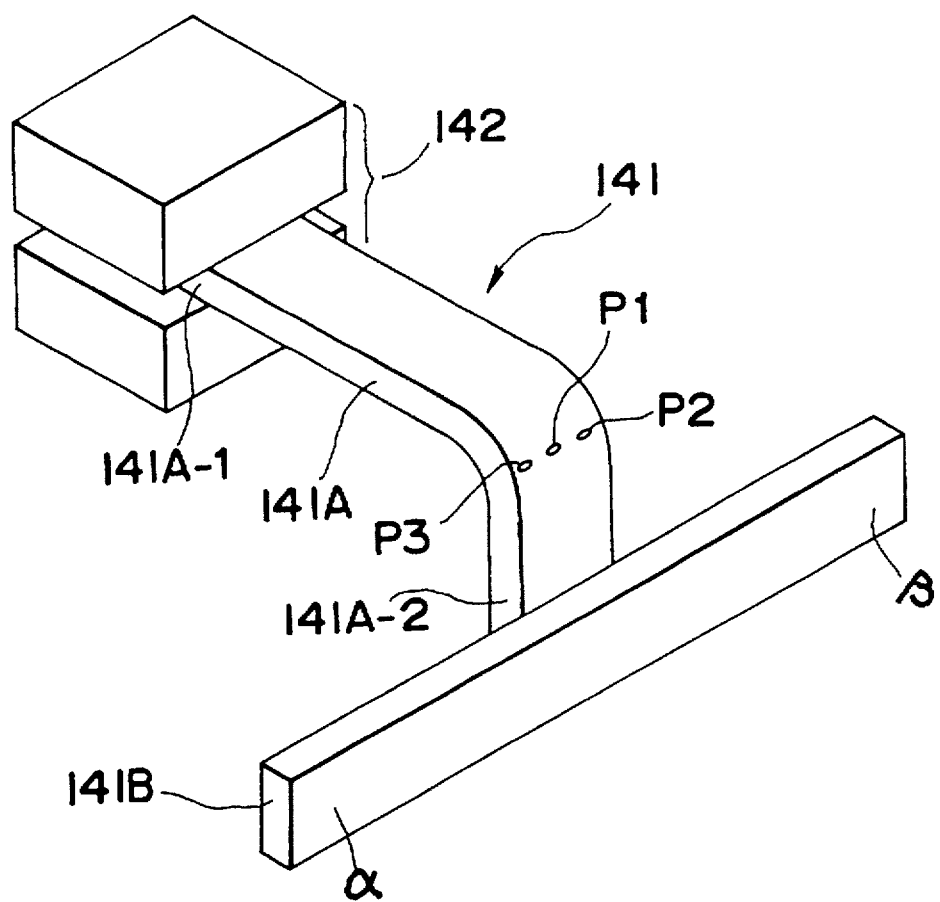
FIG. 3 is a perspective view of a member used in a method of adjusting position of the member, according to a second embodiment of the present invention.

Then, a method of adjusting position of a member 141 shown in FIG. 3, according to a second embodiment of the present invention is described. The member 141 includes an adjustable portion 141A bent to an L-shaped configuration and a rod portion 141B having a rectangular cross-sectional shape. The adjustable portion 141A is made of shape memory alloy, e.g., Ni—Ti alloy, while the rod portion 141B is made of metal different from shape memory alloy.

In the method, when the adjustable portion 141A is in a state of a straight rod prior to its bending to the L-shaped configuration, the straight adjustable portion 141A is held at a heat treatment temperature of 500° to 600° C. for about 1 h, such that this straight shape is memorized as a first shape in the adjustable portion 141A. At this time, the adjustable portion 141A has a length of 25 mm, a width of 1 mm and a thickness of 0.5 mm.

Subsequently, the adjustable portion 141A is cooled to a temperature which is lower than not only the shape recovery temperature but the martensitic transformation point and then, the adjustable portion 141A is bent to the L-shaped configuration (second shape). Thereafter, as shown in FIG. 3, one end 141A-1 of the adjustable portion 141A is gripped by a pair of clamps 142 so as to be fixed in position and the rod portion 141B is secured to the other end 141A-2 of the adjustable portion 141.

Thereafter, a heating tool (not shown) identical with that of the first embodiment is brought into contact with a spot P1, P2 or P3 momentarily so as to heat the spot P1, P2 or P3 to a temperature higher than the shape recovery temperature instantaneously such that shape of the spot P1, P2 or P3 is recovered.

Figure 4:
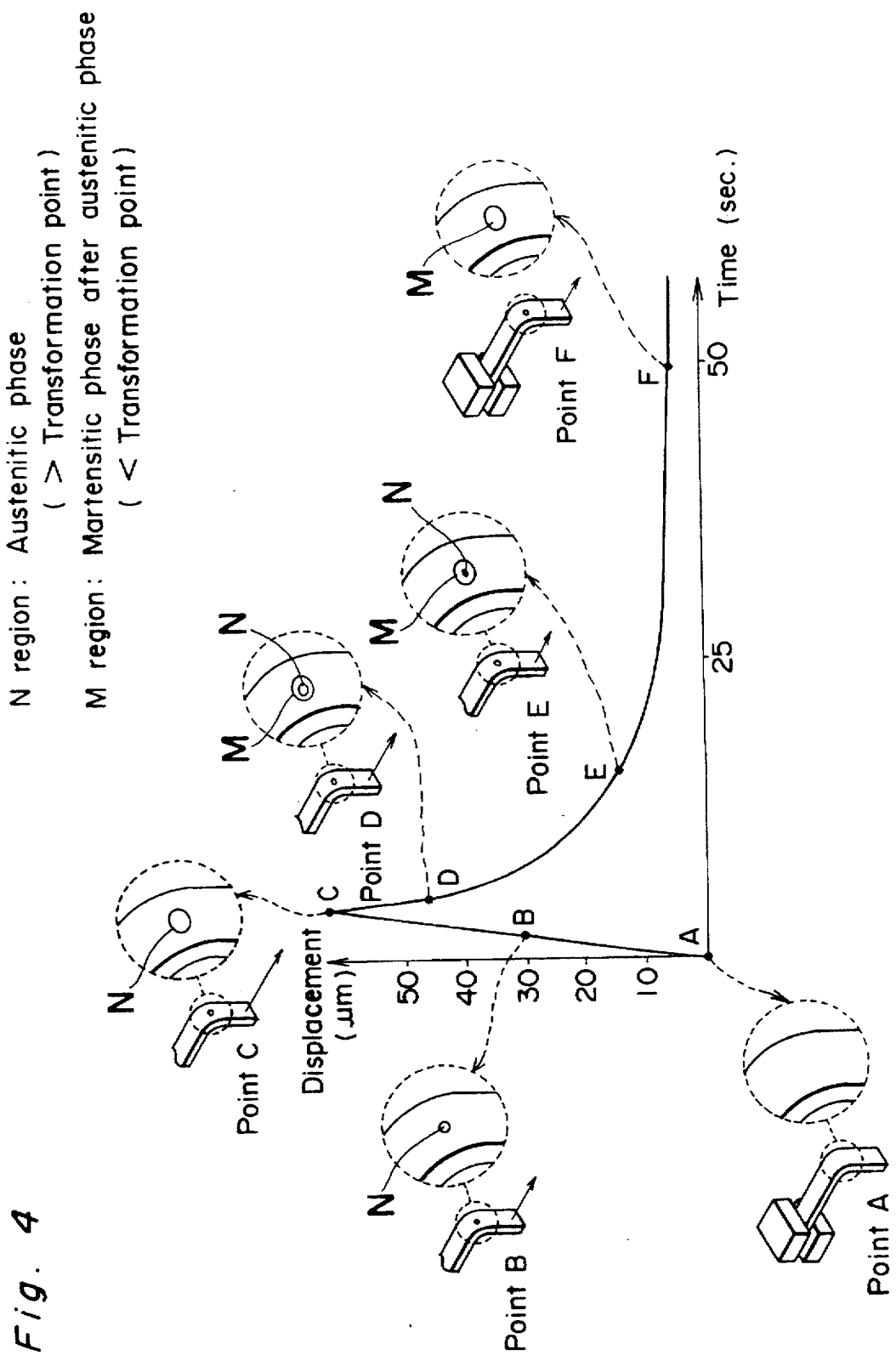
FIG. 4 is a view indicative of state of a local heating portion and changes of displacement of the local heating portion with time in the method of FIG. 3.

FIG. 4 shows changes of displacement of the other end 141A-2 of the adjustable portion 141A with time from a point A at which the heating tool heated to 250° C. is brought into contact with the spot P1, P2 or P3 to a point F at which displacement of the other end 141A-2 spaced about 10 mm from the spot P1, P2 or P3 is stabilized. For a period from the point A to the point C, the heating tool is held in contact with the spot P1, P2 or P3. Therefore, from the point A towards the point C, an N region higher than the transformation point increases and thus, displacement of the other end 141A-2 of the adjustable portion 141A increases sharply. When the graph exceeds the point C, the heating tool is brought out of contact with the spot P1, P2 or P3 and thus, the spot P1, P2 or P3 cools down gradually. Hence, in the order of the points D, E and F, the N region higher than the transformation point decreases and displacement of the other end 141A-2 also decreases. At the point F, decrease of displacement of the other end 141A-2 reaches substantially zero, thereby resulting in stabilization of displacement of the other end 141A-2. Namely, through local contact of the heating tool with the spot P1, P2 or P3 for the period from the point A to the point C, the other end 141A-2 of the adjustable portion 141A can be displaced through a value at the point F.

Then, displacement of opposite ends α and β of the rod portion 141B at the time when the heating tool is brought into contact with the spots P1, P2 and P3 three times is described with reference to FIGS. 5A to 5C and 6A to 6C. In this embodiment, the heating tool is held in contact with the spots P1, P2 and P3 for 0.5 sec. each time.

Figure 5A:
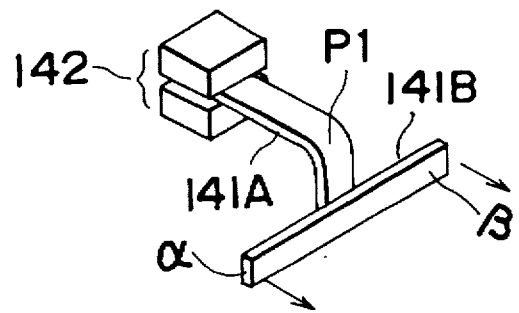
FIGS. 5A, 5B and 5C are perspective views showing local heating of spots P1, P2 and P3 of the member of FIG. 3, respectively.
Figure 6A:
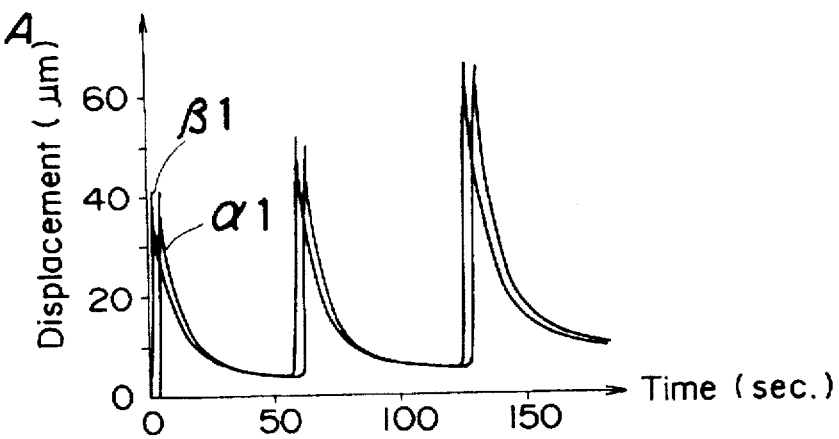
FIGS. 6A, 6B and 6c are graphs showing changes of amount of displacement of the member of FIG. 3 with time when the spots P1, P2 and P3 are heated three times, respectively.

When the heating tool is brought into contact with the spot P1 disposed at the center of the bent portion of the adjustable portion 141A, the opposite ends α and β of the rod portion 141B are displaced in the direction of the arrows of FIG. 5A as shown by the curves α1 and β1 in FIG. 6A, respectively. Three peaks of each of the curves α1 and β1 represents that the heating tool has been brought into contact with the spot P1 three times. It is seen from FIG. 6A that stable displacement of each of the opposite ends α and β of the rod portion 141B increases substantially equally by several microns in the order of the first, second third times of contact of the heating tool with the spot P1.

Figure 5B:
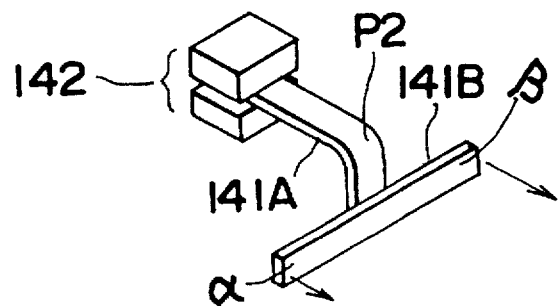
Figure 6B:
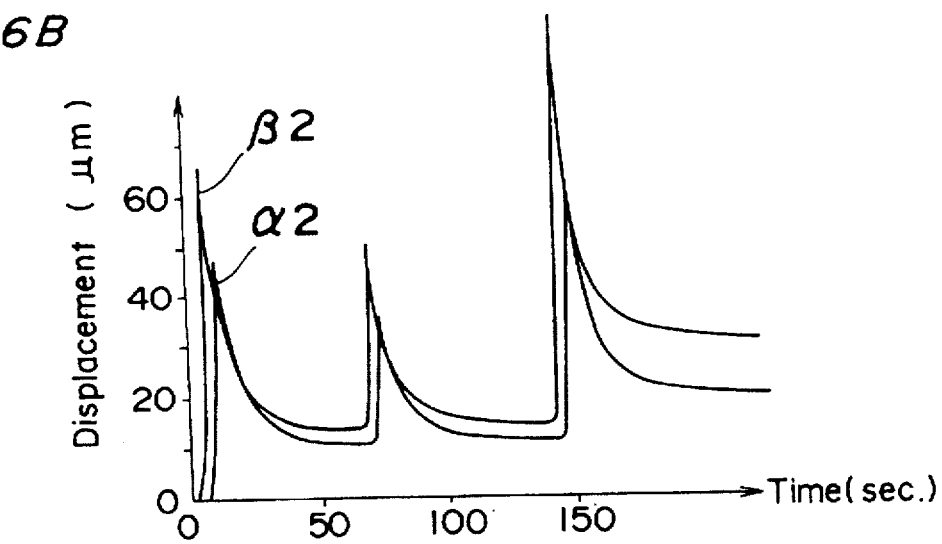

Meanwhile, when the heating tool is brought into contact with the spot P2 disposed at one side of the bent portion of the adjustable portion 141A, the opposite ends α and β of the rod portion 141B are displaced in the direction of the arrows of FIG. 5B as shown by the curves α2 and β2 in FIG. 6B, respectively. Three peaks of each of the curves α2 and β2 represents that the heating tool has been brought into contact with the spot P2 three times. It is apparent from FIG. 6B that stable displacement of each of the opposite ends α and β of the rod portion 141B increases by several microns in the order of the first, second and third times of contact of the heating tool with the spot P2. Since the spot P2 is closer to the end β than the end α, displacement of the end β is larger than that of the end α.

Figure 5C:
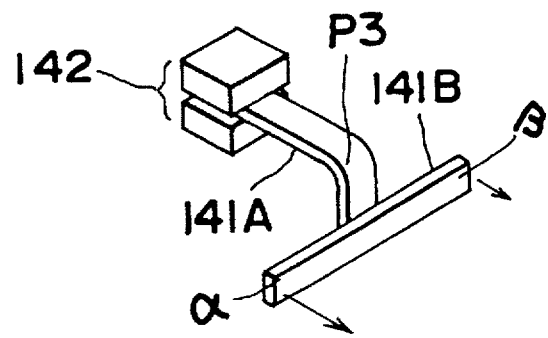
Figure 6C:
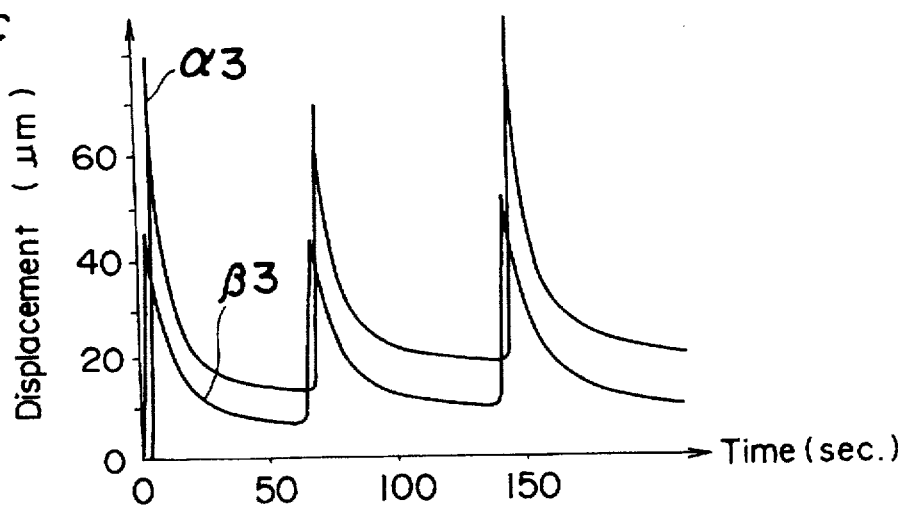

Furthermore, when the heating tool is brought into contact with the spot P3 disposed at the other side of the bent portion of the adjustable portion 141A, the opposite ends α and β of the rod portion 141B are displaced in the direction of the arrows of FIG. 5C as shown by the curves α3 and β3 in FIG. 6C, respectively. Three peaks of each of the curves α3 and β3 represents that the heating tool has been brought into contact with the spot P3 three times. It will be seen from FIG. 6C that stable displacement of each of the opposite ends α and β of the rod portion 141B increases by several microns in the order of the first, second and third times of contact of the heating tool with the spot P3. Since the spot P3 is closer to the end α than the end β, displacement of the end α is larger than that of the end β.

In the second embodiment, by bringing the heating tool into contact with the bent portion of the adjustable portion 141A locally, the opposite ends α and β of the rod portion 141A can be displaced on the order of microns. Furthermore, in the second embodiment, by selectively bringing the heating tool into contact with one of the spots P1 to P3, minute displacement of the rod portion 141B can be oriented in a parallel direction or a direction of combination of a rotational direction and the parallel direction.

Then, a method of adjusting position of a member, according to a third embodiment of the present invention is described with reference to FIGS. 7 to 10. As shown in FIG. 7, a base plate 22 having a magnetic head chip 21 attached thereto is employed as the member. The base plate 22 has a projection 22a acting as an adjustable portion and a threaded hole 22b. In this embodiment, the base plate 22 is made of Ni—Ti alloy but may also be made of shape memory alloy, for example, copper alloy such as Cu—Zn—Al alloy. Shape recovery temperature of shape memory alloy changes due to small difference of composition of the shape memory alloy. For example, in the case of Ni—Ti alloy, when content of Ni is changed between 53 and 56 wt. %, the shape recovery temperature changes to 30° to 100° C. approximately. Meanwhile, difference between martensitic transformation point and shape recovery temperature ranges from several ° C to 50° C. or so.

In the third embodiment, in view of temperature of environment for operating a video tape recorder (VCR) and heat produced by a drive unit in the VCR, composition of shape memory alloy for making the base plate is adjusted such that shape recovery temperature of the shape memory alloy is set higher than 80° C.

In the method of the third embodiment, the projection 22a of the base plate 22 is initially bent through a predetermined angle in a direction of a Z-axis at a heating portion 22a-1 disposed at a base of the projection 22a as shown in FIG. 8A. Namely, the heating portion 22a-1 is bent towards a reference surface S1 of the base plate 22. In this bent state, the base plate 22 is held at a temperature of 500° to 600° C. for about 1 h, such that the bent state is memorized in the base plate 22. The reference surface S1 of the base plate 22 acts as a surface to be mounted on a rotary drum.

Subsequently, the base plate 22 in which the shape of FIG. 8A has been memorized is cooled to a temperature which is lower than not only the shape recovery temperature but the martensitic transformation point. Then, as shown in FIG. 8B, the projection 22a is bent in a direction opposite to that of the Z-axis at the heating portion 22a-1 so as to be plastically deformed to a substantially flat shape.

Thereafter, the magnetic head chip 21 is attached to a distal end portion of the projection 22a. Thus, the base plate 22 to which the magnetic head chip 21 is attached as shown in FIG. 7 is obtained.

Figure 9:
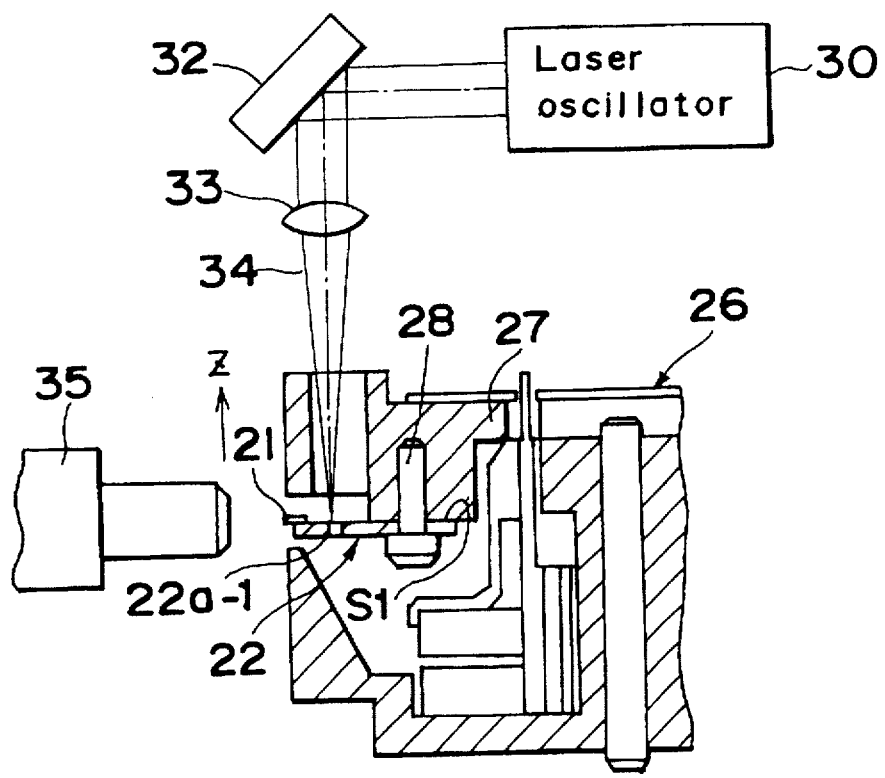
FIG. 9 is a view showing the method of FIG. 7 in which attitude of the base plate fixed to a rotary drum is adjusted by irradiating a laser beam to the base plate.

Then, as shown in FIG. 9, the base plate 22 is fastened to a holder 27 of a rotary drum 26 by a screw 28. At this time, the reference surface S1 of the base plate 22 is held in direct contact with the holder 27. Subsequently, a laser beam 34 oscillated by a laser oscillator 30 is deflected by a mirror 32 and is converged by a focusing lens 33. Then, the laser beam 34 is irradiated so as to be focused on a spot of the heating portion 22a-1 of the base plate 22. As a result, the spot of the heating portion 22a-1 is heated to a temperature higher than the shape recovery temperature and thus, the heating portion 22a-1 is locally subjected to shape recovery. Meanwhile, the laser beam 34 should not be necessarily focused on the spot of the heating portion 22a-1.

Even if power of the laser beam 34 is fixed, degree of shape recovery of the heating portion 22a-1 can be changed by changing area of the heating portion 22a-1, to which the laser beam 34 is irradiated. On the contrary, even if area of the heating portion 22a-1, to which the laser beam 34 is irradiated is fixed, degree of shape recovery of the heating portion 22a-1 can be changed through change of depth of transformation by changing period for irradiating the laser beam 34. Furthermore, degree of shape recovery of the heating portion 22a-1 can also be changed by changing both power of the laser beam 34 and area of the heating portion 22a-1, to which the laser beam 34 is irradiated.

For example, in case the laser beam is irradiated to a substantially center of the heating portion 22a-1 at a laser spot diameter of 100 μm and a radiation power of 100 mW, the magnetic head chip 21 can be displaced through 1 μm in the direction of the Z-axis. In this case, irradiation energy density of the laser beam is $1.3 \times 10^3$ W/cm$^2$ and applied energy is 10 mJ. Meanwhile, amount of displacement of the magnetic head chip 21 depends upon many factors including thickness of the base plate 22 and therefore, is not determined uniquely.

Amount of displacement of the magnetic head chip 21, i.e., amount of displacement of the magnetic head chip 21 in the direction of the Z-axis relative to the reference surface S1 can be monitored by an optical microscope 35 shown in FIG. 9. Therefore, if local heating area, heating period and heating times for the base plate 22 are controlled while amount of displacement of the magnetic head chip 21 is being monitored by the optical microscope 35 such that amount of displacement of the magnetic head chip 21 approaches a predetermined value, position of the magnetic head chip 21 can be adjusted.

By changing degree of shape recovery of the heating portion 22a-1 as described above, amount of displacement of the projection 22a in the direction of the Z-axis can be adjusted. As a result, position of the magnetic head chip 21 attached to the projection 22a, relative to the reference surface S1 can be adjusted on the order of submicrons. Namely, in the third embodiment, rough adjustment and fine adjustment of tracking height of the magnetic head chip 21 can be performed on the order of submicrons.

Figure 10:
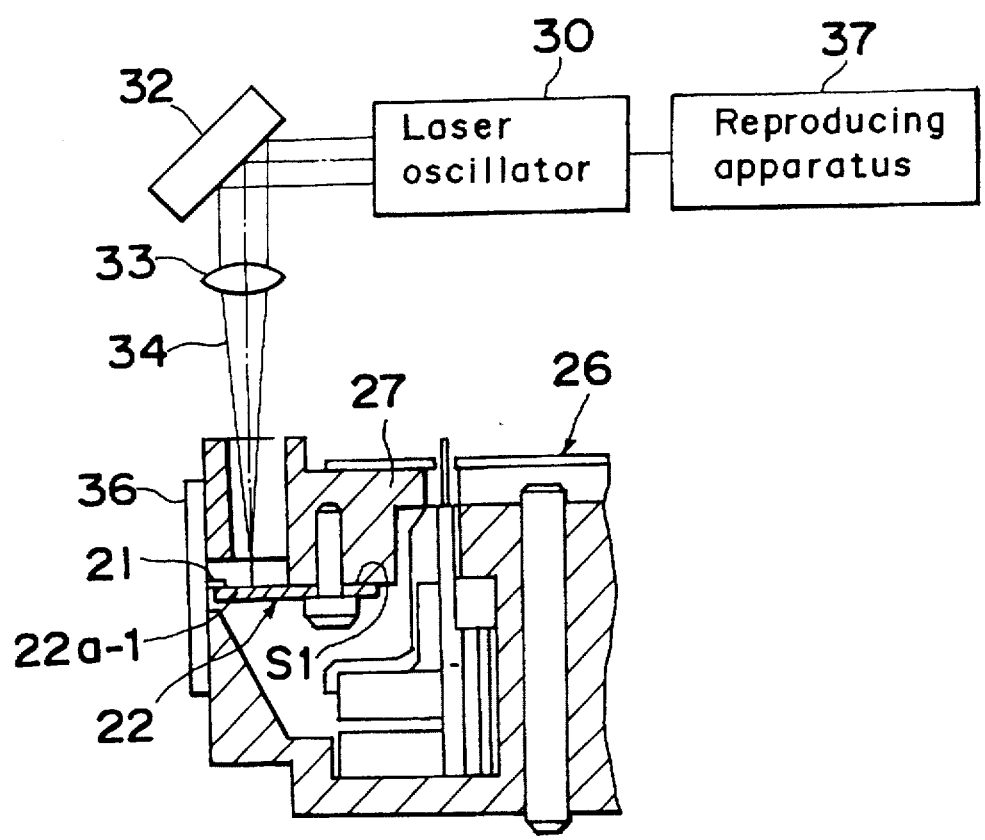
FIG. 10 is a view showing a state in which positional adjustment of the base plate of FIG. 7 is performed while a standard tape is being reproduced by the magnetic head chip.

Meanwhile, in order to make the most of such an advantage that positional adjustment of the magnetic head chip 21 can be performed in a state where the base plate 22 is mounted on the rotary drum 26, an arrangement shown in FIG. 10 may also be employed. In FIG. 10, when the rotary drum 26 is rotated in a state where the magnetic head chip 21 confronts a standard tape 36, output of magnetic reproduction of the standard tape 36 by the magnetic head chip 21 is fed back to the laser oscillator 31 from a standard tape reproducing apparatus 37 and area of the base plate 22, to which the laser beam 34 is locally irradiated and irradiation period of the laser beam 34 are controlled such that the magnetic reproduction output assumes a maximum value. In this case, minute positional adjustment of the magnetic head chip 21 can be performed fully automatically.

Meanwhile, in order to locally heat the base plate 22, any local heating means such as a heater similar to the heating tool of the first embodiment and electron beam may be used in place of the laser beam. However, the laser beam is advantageous in that temperature, irradiation area and irradiation period of the laser beam can be adjusted easily and the laser beam can be used also in air. In addition, the laser beam eliminates mechanical contact, influences of contact force, etc. can be obviated. Consequently, the laser beam is quite suitable for minute positional adjustment of the magnetic head chip 21.

Meanwhile, any kind of lasers capable of heating the spot of the heating portion 22a-1 of the base plate 22 to a temperature higher than the shape recovery temperature may be used as the laser but a YAG (yttrium aluminum garnet) laser whose power can be controlled by pulse width is employed as the laser.

Figure 11:
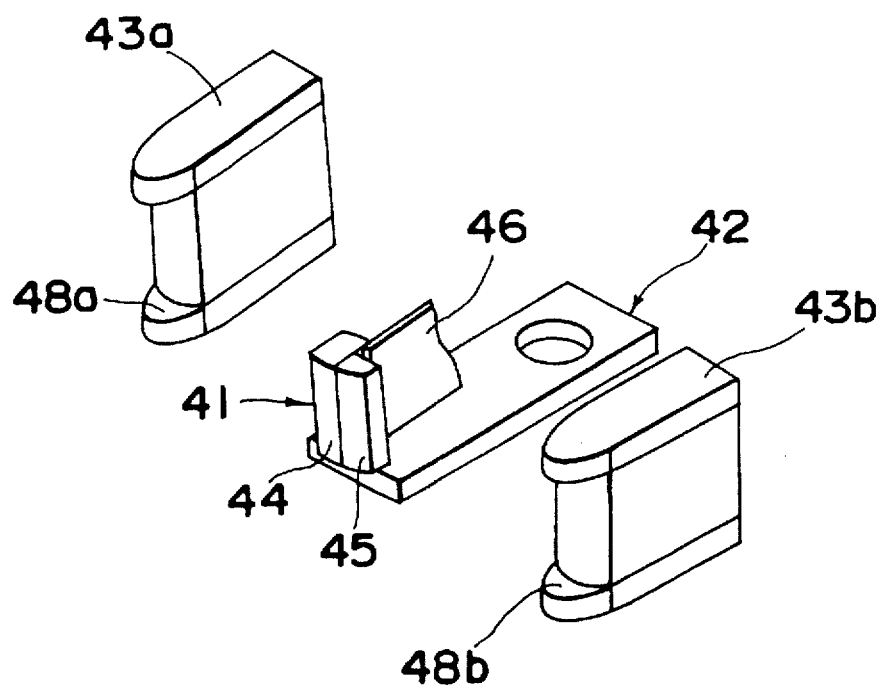
FIG. 11 is a perspective view of a stationary multichannel magnetic head used in a modification of the third embodiment.
Figure 12A:
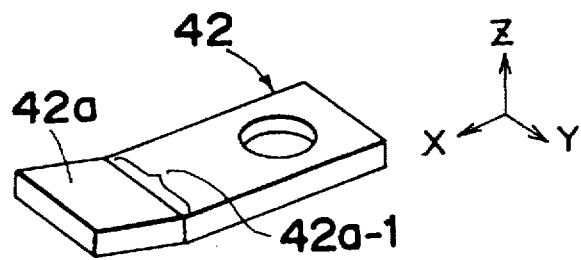
FIG. 12A is a perspective view of shape of shape memory of a base plate of the magnetic head of FIG. 11.
Figure 12B:
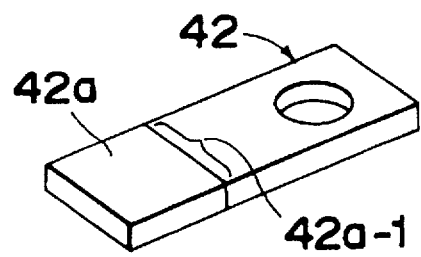
FIG. 12B is a perspective view of shape of plastic deformation of the base plate of FIG. 12A.

In the third embodiment, a case has been described in which the rotary type magnetic head 21 is attached to the convexly shaped base plate 22 with a projection 22a. However, the third embodiment can also be utilized for adjusting position of a stationary multichannel magnetic head for, typically, a digital audio appliance or a data streamer as follows. As shown in FIG. 11, a rectangular base plate 42 having a stationary multichannel magnetic head chip 41 attached thereto is employed. The magnetic head chip 41 includes a magnetic substrate 44 on which a magnetic head circuit is formed. The magnetic substrate 44 is provided with a protective substrate 45 for protecting the magnetic head circuit and a lead-out wiring substrate 46. By performing heat treatment for shape memory, an adjustable portion 42a of the base plate 42 is bent as shown in FIG. 12A such that this bent shape is memorized as a first shape in the base plate 42. Subsequently, at a temperature lower than not only the Af point but the Mf point, the base plate 42 is plastically deformed to a flat second shape as shown in FIG. 12B. Thereafter, if a heating portion 42a-1 of the adjustable portion 42a is locally heated to a temperature higher than the Af point, the adjustable portion 42a can be displacement minutely in a direction of a Z-axis of FIG. 12A.

Therefore, by controlling conditions for irradiating a laser beam to the base plate 42 such that height of the magnetic head chip 41 relative to reference portions 48a and 48b of tape guides 43a and 43b, i.e., tracking height of the magnetic head chip 41 assumes a predetermined height, positional adjustment of the magnetic head can performed. A magnetic tape (not shown) runs while being guided by the tape guides 43a and 43b so as to confront the magnetic head chip 41. As described above, positional adjustment utilizing shape memory effect can be applied to any application requiring minute positional adjustment.

Then, a method of adjusting position of a member, according to a fourth embodiment of the present invention is described with reference to FIGS. 13A and 13B. In the fourth embodiment, a base plate 52 having a magnetic head chip (not shown) attached thereto is used as the member. Since the fourth embodiment is characterized by procedures for performing shape memory in the base plate 52 and the base plate 52 is identical with the base plate 22 of the third embodiment, shape memory and shape recovery of the base plate 52 are mainly described below.

In the method of the fourth embodiment, a first heating portion 52a-1 disposed at a base of a projection 52a of the base plate 52 is initially bent in a direction away from a reference surface S31 of the base plate 52 as shown in FIG. 13A. Furthermore, a second heating portion 52a-2 abutting on a distal end portion 52a-3 of the projection 52a is bent in a direction towards the reference surface S31. Then, the distal end portion 52a-3 of the projection 52a is bent so as to extend substantially in parallel with the reference surface S31. This bent base plate 52 is held at a temperature of 500° to 600° C. for about 1 h, such that this bent shape of the base plate 52 is memorized as a first shape in the base plate 52

Subsequently, the base plate 52 is cooled to a temperature which is lower than not only the shape recovery temperature but the martensitic transformation point. Then, the base plate 52 is plastically deformed to a flat second shape as shown in FIG. 13B. Thereafter, the magnetic head chip is attached to the distal end portion 52a-3 of the base plate 52. Then, if a laser beam is irradiated to the first heating portion 52a-1 of the base plate 52 so as to locally heat the first heating portion 52a-1 to a temperature higher than the shape recovery temperature, the magnetic head chip can be displaced minutely in the direction away from the reference surface S31. On the other hand, if a laser beam is irradiated to the second heating portion 52a-2 so as to locally heat the second heating portion 52a-2 to a temperature higher than the shape recovery temperature, the magnetic head chip can be displaced minutely in the direction towards the reference surface S31.

In the fourth embodiment, the magnetic head chip can be displaced minutely in both the direction towards the reference surface S31 and the direction away from the reference surface S31 as described above. Therefore, in the fourth embodiment, since the magnetic head chip can be moved towards and away from the reference surface S31, minute adjustment of position of the magnetic head chip can be performed easily.

For example, when a spot of the first heating portion 52a-1 of the base plate 52 is heated to a temperature higher than the Af point by irradiating a laser beam to the spot of the first heating portion 52a-1, such a phenomenon may undesirably happen in which the projection 52a of the base plate 52 is displaced in the direction away from the reference surface S31 beyond a target value. In this case, if the second heating portion 52a-2 of the base plate 52 is locally heated by a laser beam to a temperature higher than the Af point, excessive displacement of the projection 52a in the direction can be corrected through minute displacement of the projection 52a in the opposite direction.

Meanwhile, in the fourth embodiment, the base plate 52 has a projection as shown in FIG. 13A but may also be replaced by a rectangular base plate 62 shown in FIG. 22A. In this case, a first shape of the base plate 62 in which first and second heating portions 62a-1 and 62a-2 of the base plate 62 are bent is memorized in the base plate 62 at a heat treatment temperature for shape memory. Subsequently, the base plate 52 is cooled to a temperature lower than the shape recovery temperature and then, the base plate 62 is formed to a flat shape through plastic deformation of the first and second heating portions 62a-1 and 62a-2 as shown in FIG. 22B. Thereafter, if the first heating portion 62a-1 is subjected to shape recovery through local heating, a distal end portion 62a-3 of the base plate 62 can be displaced minutely in a direction opposite to that of a Z-axis in FIG. 22A. On the contrary, if the second heating portion 62a-2 is locally subjected to shape recovery, the distal end portion 62a-3 of the base plate 62 can be displaced minutely in the direction of the Z-axis.

Then, a method of adjusting position of a member, according to a fifth embodiment of the present invention is described with reference to FIGS. 14A and 14B. In this embodiment, a base plate 72 having a magnetic head chip (not shown) attached thereto is employed as the member.

Since the fourth embodiment is characterized by procedures for performing shape memory in the base plate 72 and the base plate 72 is identical with the base plate 22 of the third embodiment, shape memory and shape recovery of the base plate 72 are mainly described below.

In the method of the fifth embodiment, a heating portion 72a-1 disposed at a base of a projection 72a is twisted counterclockwise through a predetermined amount about an axis T of the base plate 72, which extends in a direction of protrusion of the projection 72a as shown in FIG. 14A. In this twisted first shape of the base plate 72, the base plate 72 is held at a temperature of 500° to 600° C. for about 1 h, such that the twisted first shape of the base plate 72 is memorized in the base plate 72.

Subsequently, the base plate 72 is cooled to a temperature which is lower than not only the shape recovery temperature but the martensitic transformation point Then, the base plate 72 is subjected to plastic deformation such that the above mentioned twist is eliminated. As a result, a heating portion 72a-2 disposed at a central portion of the projection 72a is plastically extended in the direction of protrusion of the projection such that the base plate 72 as a whole is formed into a flat second shape as shown in FIG. 14B. Thereafter, the magnetic head chip is attached to a distal end portion 72a-3 of the projection 72a.

Then, by locally heating the heating portion 72a-1 by a laser beam to a temperature higher than the shape recovery temperature, the projection 72a can be counterclockwise rotated minutely about the axis T at a high resolution of not more than (1/60) degree. Meanwhile, by locally heating the heating portion 72a-2 to a temperature higher than the shape recovery temperature by a laser beam, the heating portion 72a-2 can be compressed through a minute distance in a direction opposite to that of protrusion of the projection 72a and thus, distance of protrusion of the magnetic head chip in the direction of protrusion of the projection 72a can be adjusted on the order of submicrons.

Meanwhile, in the fifth embodiment, plastic extension of the heating portion 72a-2 is subjected to shape memory but plastic compression of the heating portion 72a-2 may also be subjected to shape memory.

Furthermore, in the fifth embodiment, the base plate 72 has a projection 72a as shown in FIG. 14A but may also be replaced by a rectangular base plate 82 shown in FIG. 23A. In this case, a base portion 82a-1 of an adjustable portion 82a is twisted counterclockwise at a temperature higher than the Af point as shown in FIG. 23A and this twisted first shape of the base plate 82 is memorized in the base plate 82. Then, at a temperature lower than the Mf point, the base portion 82a-1 of the adjustable portion 82a is twisted clockwise so as to be subjected to plastic deformation such that the base plate 82 is formed into a flat shape as shown in FIG. 23B. Thus, if the base plate 82 is subjected to shape recovery by locally heating the base portion 82a-1, a distal end portion 82a-2 of the adjustable portion 82a can be minutely rotated counterclockwise.

As described in the third, fourth and fifth embodiments, by local shape recovery based on local heating, the magnetic head can be minutely adjusted to a desired shape between the first shape memorized at shape memory processing and the second shape obtained by plastic deformation after cooling. Namely, by changing shape obtained at the time of shape memory processing of shape memory alloy, attitude of the magnetic head can be adjusted in all directions including tracking direction, azimuthal direction, etc.

Shape memory alloy is capable of memorizing deformations such as extension and compression, torsion and bending. Therefore, by the above mentioned extension and compression, attitude of the magnetic head in the direction of protrusion of the projection can be adjusted. Meanwhile, by torsion referred to above, attitude of the magnetic head in azimuthal direction can be adjusted. Furthermore, by the above described bending, attitude of the magnetic head in tracking direction, tilting direction and flapping direction can be adjusted. Accordingly, by devising shape obtained at the time of shape memory processing through combination of the above embodiments of the present invention, attitude of the magnetic head chip can be adjusted in every direction as described above after the magnetic head chip has been mounted on the base plate.

In the above embodiments of the present invention, since fine adjustment of position of the magnetic head can be performed on the order of submicrons as described above, hitherto necessary laborious operations such as ranking of tracking height of the magnetic head and rough adjustment of tracking height by the use of shims can be eliminated. Meanwhile, drop of accuracy due to curing shrinkage of resin used for attaching the magnetic head chip to the base plate can also be obviated. Therefore, in the above embodiments, positional adjustment process can be automated by eliminating ranking of tracking height of the magnetic head and thus, productivity can be raised greatly. Furthermore, in case a function of adjusting azimuthal angle is incorporated, a magnetic head chip which has been proved defective in inspection of azimuthal angle can be turned to a usable conforming article through its azimuthal adjustment. Accordingly, in the above embodiments, the highly accurate magnetic head can be obtained at high productivity.

Then, a method of adjusting position of a member, according to a sixth embodiment of the present invention is described. In the sixth embodiment, a magnetic head 100 including two magnetic head chips 101A and 101B attached to projections 102A and 102B of a base plate 102 as shown in FIG. 15A is used as the member. Since the magnetic head 100 includes the two magnetic head chips 101A and 101B, the magnetic head 100 can act as a double azimuth type pair magnetic head by imparting positive and negative azimuthal angles to one and the other of the magnetic head chips 101A and 101B, respectively.

The base plate 102 is made of Ni—Ti alloy but may also be made of shape memory alloy, e.g., copper alloy such as Cu—Zn—Al alloy in place of Ni—Ti alloy. In this embodiment, by setting composition of the shape memory alloy constituting the base plate 102 such that the shape recovery temperature exceeds 80° C., the base plate 102 is not supposed to reach the shape recovery temperature by temperature of environment for operating the VCR and heat produced by a drive unit in the VCR.

In the method of the sixth embodiment, heating portions 102A-1 and 102B-1 disposed at bases of projections 102A and 102B and extending in a direction of a Y-axis are initially bent through a predetermined angle in a direction of a Z-axis as shown in FIG. 15B. In this bent first shape, the base plate 102 is held at a heat treatment temperature of 500° to 600° C. for shape memory for about 1 h such that the bent first shape of the base plate 102 is memorized in the base plate 102. A reference surface S51 of the base plate 102 faces in the direction of the Z-axis. The reference surface S51 acts as a reference surface for mounting the magnetic head 100 on a rotary drum (not shown).

Subsequently, the base plate 102 is cooled to a temperature which is lower than not only the shape recovery temperature but the martensitic transformation point. Then, the heating portions 102A-1 and 102B-1 are bent in a direction opposite to that of the Z-axis. As a result, the heating portions 102A-1 and 102B-1 are subjected to plastic deformation such that the base plate 102 as a whole is formed into a flat shape as shown in FIG. 15C. Then, the magnetic head chips 101A and 101B are attached to distal end portions of the projections 102A and 102B of the base plate 102, respectively and thus, the magnetic head chip 100 shown in FIG. 15A is obtained.

Thereafter, by locally irradiating a laser beam to the heating portions 102A-1 and 102B-1 of the base plate 102 independently of each other, the heating portions 102A-1 and 102B-1 are heated to a temperature higher than the shape recovery temperature independently of each other. One concrete example of this heating is illustrated in FIG. 17. In FIG. 17, reference numeral "D1" denotes a rotary drum. By this heating, the heating portions 102A-1 and 102B-1 can be displaced on the order of submicrons in the direction of the Z-axis through independent shape recovery. Accordingly, in the sixth embodiment, the magnetic head chips 101A and 101B can be minutely displaced in the direction of the Z-axis independently of each other. In other words, in the sixth embodiment, height of each of the magnetic head chips 101A and 101B relative to the reference surface S51 can be adjusted to a predetermined value and difference in height between the magnetic head chips 101A and 101B can be adjusted at a predetermined accuracy.

In the sixth embodiment, attitude of the magnetic head chips 101A and 101B can be adjusted independently of each other. Meanwhile, the base plate 102 may also be twisted at a heat treatment temperature for shape memory such that this twisted first shape of the base plate 102 is memorized in the base plate 102. Subsequently, twist of the base plate 102 is eliminated at a temperature lower than the martensitic transformation point and then, the base plate 102 is plastically extended or compressed to a second shape such that this second shape is memorized in the base plate 102. As a result, amount of protrusion and azimuthal amount of the magnetic head chips also can be adjusted. Meanwhile, if the sixth embodiment is applied to a magnetic head in which not less than three magnetic head chips are, respectively, provided at not more than three projections of a base plate, it is needless to say that the magnetic head chips can be adjusted independently of each other.

Meanwhile, in case the pair magnetic head having the two magnetic head chips as in the sixth embodiment is used, only one pair magnetic head 100 is required to be mounted on the rotary drum D1 as shown in FIG. 16C in comparison with a case in which two single type magnetic heads H1 and H2 are mounted on the rotary drum D1 as shown in FIG. 16A, so that positional adjustment of the magnetic head is simplified as compared with the case of FIG. 16A. FIG. 16B shows a pair magnetic head similar to the magnetic head 100 of this embodiment.

Then, a method of adjusting position of a member, according to a seventh embodiment of the present invention is described. In the seventh embodiment, a magnetic head 110 including two magnetic head chips 111A and 111B and a base plate 112 as shown in FIG. 18 is used as the member. The base plate 112 has two projections 112A and 112B and a mounting portion 113. The projections 112A and 112B are made of shape memory alloy. Meanwhile, the mounting portion 113 has a rectangular main body 113A and a frame 113B surrounding the main body 113A. The main body 113A is formed with a hole and is made of thermoplastic. The frame 113B is made of shape memory alloy and is coupled with the projections 112A and 112B. Meanwhile, the main body 113A of the mounting portion 113 may also be made of resin other than thermoplastic. In this embodiment, the projections 112A and 112B are made of Ni—Ti alloy but may also be made of copper alloy such as Cu—Zn—Al alloy.

In the method of the seventh embodiment, heating portions 112A-1 and 112B-1 of the projections 112A and 112B of the base plate 112 in which the main body 113A made of thermoplastic is not provided are initially bent in a direction of a Z-axis, i.e., in a direction in which a reference surface S61 of the main body 11 faces as shown in FIG. 19A. The heating portions 112A-1 and 112B-1 extend in a direction of a Y-axis at bases of the projections 112A and 112B.

Subsequently, in this bent first shape of the base plate 112 in which the resinous main body 113A is not provided, at least the projections 112A and 112B of the base plate 112 are held at a heat treatment temperature of 500° to 600° C. for shape memory such that the bent first shape of the base plate 112 is memorized in the base plate 112.

Thereafter, the base plate 112 in which the main body 113A is not provided is placed in a molding die and thermoplastic is injected into the die so as to form the main body 113A inside the frame 113B. As a result, the base plate 112 integrally molded by composite material of shape memory alloy and resin is obtained.

Subsequently, the base plate 112 in which the main body 113A is provided is cooled to a temperature which is lower than not only the shape recovery temperature but the martensitic transformation point. Then, the projections 112A and 112B of the base plate 112 are bent in a direction opposite to that of the Z-axis so as to be subjected to plastic deformation such that the base plate 112 is formed into a flat second shape as shown in FIG. 19B. Then, the magnetic head chips 111A and 111B are, respectively, attached to the projections 112A and 112B of the base plate 112 and thus, the magnetic head 110 shown in FIG. 18 is obtained.

Then, the heating portions 112A-1 and 112B-1 of the projections 112A and 112B of the base plate 112 are locally heated to a temperature higher than the shape recovery temperature independently of each other by a laser beam. Thus, the heating portions 112A-1 and 112B-1 are displaced for shape recovery in the direction of the Z-axis independently of each other on the order of submicrons. Therefore, position of the magnetic head chips 111A and 111B can be adjusted independently of each other on the order of submicrons.

Meanwhile, since the main body 113A of the base plate 112 is made of resin, production cost of the base plate can be lowered as compared with a case in which the main body 113A is made of shape memory alloy.

Furthermore, in the seventh embodiment, the projections 112A and 112B are subjected to plastic deformation at low temperature after injection molding for forming the resinous main body 113A has been performed. However, if temperature for the above mentioned injection molding is lower than the shape recovery temperature, plastic deformation of the two projections may also be performed prior to the injection molding.

Meanwhile, in the seventh embodiment, the base plate 112 has the two projections 112A and 112B. However, as shown in FIG. 20, it is needless to say that the seventh embodiment can also be applied to a base plate 122 having only one projection 122A to which one magnetic head chip 121 is attached. In the base plate 122, the projection 122A and a frame 123B extending from the projection 122A and surrounding a rectangular resinous portion 123A are made of shape memory alloy. In the same manner as the seventh embodiment, a first shape shown in FIG. 21A is memorized in the base plate 122 at a heat treatment temperature for shape memory. Then, the base plate 122 is subjected to plastic deformation to a second shape shown in FIG. 21B at a temperature lower than the shape recovery temperature such that the second shape is memorized in the base plate 122. Subsequently, local shape recovery of a heating portion 122A-1 of the base plate 122 is performed by locally irradiating a laser beam to the heating portion 122A-1 and thus, position of the magnetic head chip 121 can be minutely adjusted on the order of microns.

Furthermore, as shown in FIG. 24, the seventh embodiment can also be applied to a rectangular base plate 133 to which a stationary magnetic head chip 41 is secured. The base plate 133 includes a rectangular resinous portion 134A formed with a hole, an adjustable portion 133A and a frame 134B extending from the adjustable portion 133A and surrounding the resinous portion 134A. The adjustable portion 133A and the frame 134B are made of shape memory alloy. In the same manner as the seventh embodiment, a heating portion 133A-1 of the base plate 133 is bent to a first shape shown in FIG. 25A and the first shape is memorized in the base plate 133 at a heat treatment temperature for shape memory. Subsequently, the base plate 133 is subjected to plastic deformation to a second shape shown in FIG. 25B at a temperature lower than the shape recovery temperature such that the second shape is memorized in the base plate 133. Then, local shape recovery of the heating portion 133A-1 is performed by locally irradiating a laser beam to the heating portion 133A-1 and thus, position of the magnetic head chip 41 can be minutely adjusted on the order of microns.

Figure 27A:
Figure 27B:
Figure 27C:
Figure 27D:
Figure 27E:
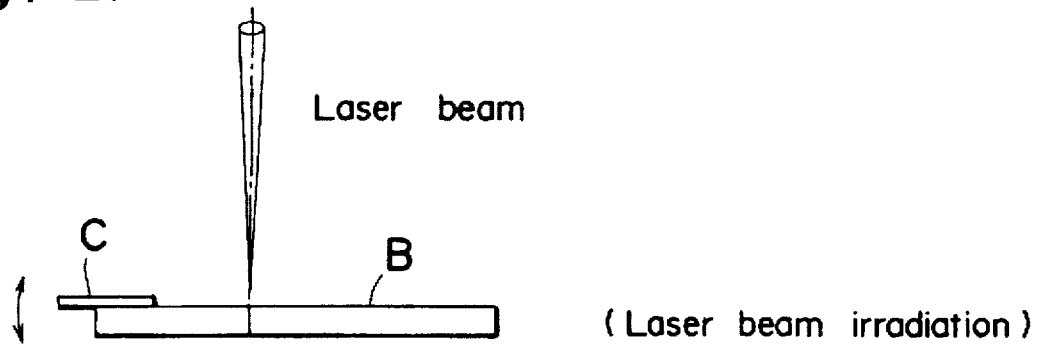

Then, basic steps common in the methods of the third to seventh embodiments are described with reference to FIGS. 27A to 27E. Initially, a flat base plate B shown in FIG. 27A is bent to a first shape as shown in FIG. 27B and is held at a heat treatment temperature for shape memory for about 1 h, such that the first shape is memorized in the base plate B. Subsequently, the base plate B is cooled to a temperature lower than the martensitic transformation temperature and is subjected to plastic deformation to a second shape as shown in FIG. 27C. Thereafter, a magnetic head chip C acting as a functional component is attached to the base plate B as shown in FIG. 27D. Then, by irradiating a laser beam to a spot of the base plate B as shown in FIG. 27E so as to heat the spot to a temperature higher than the shape recovery temperature such that the base plate B is subjected to local shape recovery. As a result, position of the magnetic head chip C can be minutely adjusted.

Hereinafter, effects of the method of the present invention are described with reference to claims. The method of claim 1 comprises the steps of (a) heat-treating for shape memory in the first shape the member including the adjustable portion made of material having shape memory effect such that the first shape is memorized in the adjustable portion; (b) plastically deforming the adjustable portion after cooling the adjustable portion to less than the shape recovery temperature; and (c) locally heating the adjustable portion to more than the shape recovery temperature so as to subject the adjustable portion to local shape recovery.

Therefore, in the method of claim 1, by performing local shape recovery of the adjustable portion through its local heating, the adjustable portion can be minutely displaced in a direction oriented from the plastically deformed second shape to the first shape subjected to shape memory. This minute amount of displacement of the adjustable portion can be controlled by controlling power of local heating, heating area or heating volume and heating period.

Accordingly, the method of claim 1 has the following advantages (1) to (3) over a prior art method in which the member is thermally molten so as to be displaced.

(1) Since operational principle is based on displacement due to phase change of shape memory alloy, fixed position (attitude) does not change permanently after adjustment.

(2) When the adjustable portion made of shape memory material is plastically deformed in a plurality of directions and a plurality of deformable portions are subjected to local shape recovery, positional adjustment of the deformable portions can be, respectively, performed in the directions independently of each other.

(3) In comparison with thermal melting by the use of a laser, the adjustable portion of the member can be displaced at low heating power.

Meanwhile, since the member itself is displaced upon minute displacement of the adjustable portion, a jig or an actuator for displacing the member is not required to be provided. Therefore, dimensional restriction and restriction of degree of freedom in positional adjustment, which are caused by the jig or the actuator, can be eliminated. Furthermore, adverse influence due to curing of adhesive can be avoided.

Meanwhile, in the method of claim 2, the member is the base plate having the magnetic head chip attached thereto.

Therefore, in the method of claim 2, by locally heating to more than the shape recovery temperature the adjustable portion made of shape memory material, the base plate can be displaced minutely in the direction of shape recovery from the plastically deformed second shape to the first shape subjected to shape memory. Therefore, if the base plate is arranged for shape recovery in tracking direction, the base plate is displaced in tracking direction by locally irradiating a laser beam to the adjustable portion. Meanwhile, amount of displacement of the base plate is also controlled highly accurately by power of the laser.

Accordingly, when plastic deformation and shape memory are performed such that the direction of shape recovery from the second shape to the first shape in the base plate coincides with arbitrary directions such as tracking direction, azimuthal direction, flapping direction and direction of protrusion of the projection, the base plate can be displaced at high accuracy in any direction. Furthermore, since displacement of the adjustable portion is based on phase change of the shape memory material, displacement of the adjustable portion is quite stable without its changes with time.

Meanwhile, the method of claim 3 comprises, between the steps (b) and (c) of claim 1, the further step of attaching to the member the functional component performing the predetermined function when disposed at the predetermined position in the appliance such that the adjustable portion is disposed at the predetermined position in the appliance by the step (c).

Therefore, the method of claim 3 achieves the following effects (1) to (6) in production technique for industrial use and home use.

(1) Not only the member itself on which the functional component is mounted can be used as an actuator but the laser acting as a heating source can be used for driving the adjustable portion. Therefore, an expensive positional adjustment apparatus provided with a highly accurate multidimensional actuator is not required to be used and thus, need for skillful workers having high technique for attitudinal adjustment is eliminated. Accordingly, the positional adjustment apparatus can be simplified structurally and fully automated.

(2) If local heating of the adjustable portion is performed by a non-contact means such as a laser, positional adjustment of the member can be performed not only in a static state in which the member is at a standstill but in a dynamic state in which the member is moving.

(3) In contrast with prior art utilizing an actuator, the functional component can be preliminarily fixed to the member by resinous adhesive prior to positional adjustment of the member. Therefore, since curing shrinkage of the resinous adhesive after positional adjustment can be avoided and thus, positional change of the functional component due to curing of the resinous adhesive can be eliminated completely.

Meanwhile, at a final stage of positional adjustment of the member after mounting of the functional component on the member, positional adjustment of the member and the functional component can be performed and thus, positional error due to mounting of the functional component on the member can be absorbed. Therefore, dimensional accuracy required of the functional component itself prior to mounting of the functional component on the member can be lowered.

(4) By controlling heating power, heating area or heating volume and heating period for the adjustable portion made of shape memory material, rough adjustment and fine adjustment of position of the member can be performed.

(5) When the adjustable portion made of shape memory material is plastically deformed in a plurality of directions and a plurality of deformable portions are subjected to local shape recovery, positional adjustment of the deformable portions can be, respectively, performed in the directions independently of each other.

(6) Since operational principle is based on displacement due to phase change of shape memory alloy, fixed position (attitude) does not change permanently after adjustment.

In the method of claim 3, productivity of appliances for industrial use and home use can be raised, production cost of the appliances can be lowered and functional reliability of the appliances can be improved as a result of the above effects (1) to (6).

Meanwhile, in the method of claim 4, the functional component is the magnetic head chip and the member is the base plate.

Therefore, in the method of claim 4, not only the member itself on which the functional component is mounted can be used as an actuator but the laser acting as a heating source can be used for driving the adjustable portion. Therefore, the positional adjustment apparatus for the magnetic head can be simplified structurally and fully automated.

If local heating of the adjustable portion is performed by a non-contact means such as a laser, positional adjustment of the magnetic head chip attached to the base plate can be performed not only in a static state in which the base plate having the magnetic head chip attached thereto is at a standstill but in a dynamic state in which the base plate is rotating.

Meanwhile, when the adjustable portion made of shape memory material is plastically deformed in a plurality of directions and a plurality of deformable portions are subjected to local shape recovery, positional adjustment of the deformable portions can be, respectively, performed in the directions independently of each other.

Since operational principle is based on displacement due to phase change of shape memory alloy, fixed position (attitude) does not change permanently after adjustment.

In the method of claim 5, the adjustable portion is made of shape memory alloy. Since Af point of shape memory alloy can be set higher than 80° C., period required for heat dissipation can be shortened greatly in comparison with prior art. Therefore, processing period required for positional adjustment can be shortened, thereby resulting in improvement of production efficiency.

In the method of claim 6, the member includes the resinous portion made of polymeric resin and the adjustable portion is made of shape memory alloy. Thus, in comparison with a case in which the member is wholly made of shape memory alloy, production cost of the member can be reduced. Meanwhile, if the adjustable portion and the resinous portion are subjected to integral molding, mass productivity is raised remarkably.

In the method of claim 7, since a laser beam acting as a non-contact heating means is used as a means for heating the spot of the adjustable portion, positional adjustment can be performed not only in a static state in which the member is at a standstill but in a dynamic state in which the member is moving.

Meanwhile, in the method of claim 8, plastic deformation of the adjustable portion includes first plastic deformation of plastically deforming the first portion of the adjustable portion in the first direction and second plastic deformation of plastically deforming the second portion of the adjustable portion in the second direction. Therefore, in the method of claim 8, the adjustable portion can be minutely displaced in the first direction if the first portion is heated locally, while the adjustable portion can be minutely displaced in the second direction if the second portion is heated locally. Namely, in the method of claim 8, the member can be displaced in the two directions.

In the method of claim 9, the adjustable portion of the member is twisted about the predetermined axis as plastic deformation of the adjustable portion. Therefore, in the method of claim 9, by locally heating the adjustable portion, the adjustable portion can be minutely displaced in the twisted direction.

The method of claim 10 comprises the steps of: heat-treating for shape memory the adjustable portion in the first shape such that the first shape is memorized in the adjustable portion; plastically deforming the adjustable portion to the second shape after cooling the adjustable portion to less than the shape recovery temperature; attaching to the base plate including the adjustable portion made of material having shape memory effect, the magnetic head chip performing predetermined magnetic recording and reproducing functions when the magnetic head chip is disposed at a predetermined position in the video tape recorder; attaching the base plate to the rotary drum; and irradiating, while the base plate is being rotated upon rotation of the rotary drum, a laser beam to the spot of the adjustable portion of the base plate so as to heat the spot to more than the shape recovery temperature such that the base plate is subjected to local shape recovery, whereby the magnetic head chip is disposed at the predetermined position in the video tape recorder.

Namely, in the method of claim 10, the adjustable portion of the base plate is locally heated by the laser beam acting as a non-contact heating means while the rotary drum is being rotated in a state where the base plate having the magnetic head chip attached thereto is mounted on the rotary drum. Therefore, in the method of claim 10, positional adjustment of the magnetic head chip can be performed while the rotary drum is being rotated. Accordingly, positional adjustment of the magnetic head chip can be performed in a state quite similar to that of its practical use.

Especially, in case a fluid bearing is used as a bearing for the rotary drum, position of the rotary drum relative to a fixed drum changes greatly between its stational state and its rotational state. Therefore, by performing positional adjustment of the base plate, i.e., the magnetic head chip while the rotary drum is being rotated, positional adjustment of the magnetic head chip can be performed at high accuracy.

Furthermore, in the method of claim 11, the laser beam is irradiated to the spot of the base plate so as to subject the base plate to local shape recovery such that the magnetic head chip confronting a standard magnetic tape upon rotation of the rotary drum has a predetermined output for magnetically reproducing the standard magnetic tape.

Therefore, in the method of claim 11, attitude of the magnetic head chip can be subjected to feedback control on the basis of output from the standard magnetic tape. Accordingly, attitudinal adjustment of the magnetic head chip, which has been conventionally performed by trial and error, can be fully automated, thereby resulting in remarkable rise of productivity.

Meanwhile, in the member of claims 12 to 22, which is subjected to positional adjustment, effects identical with those of the method of claims 1 to 11 can be obtained.

Hereinafter, a method of adjusting position of an objective lens, according to one embodiment of another aspect of the present invention is described. FIG. 28 shows an objective lens actuator used in the method of the present invention. The objective lens actuator includes an objective lens 306 and an objective lens holder 306a for holding the objective lens 306. The objective lens holder 306a is supported by a pair of leaf springs 313 movable in a focusing direction of the arrow F. The objective lens 306 is pivotally movable in the focusing direction of the arrow F, i.e., in a direction of an optical axis of the objective lens 306 through deflection of the leaf springs 313. The leaf springs 313 are coupled with an intermediate support 314 and the intermediate support 314 is supported by a pair of leaf springs 316 movable in a radial direction of the arrow R. One end of each of the leaf springs 316 is secured to each of a pair of pillared projections 315a. Thus, the intermediate support 314 and the objective lens holder 306a are pivotally movable in the radial direction of the arrow R.

Meanwhile, a focusing coil 317 wound around the objective lens holder 306a and radial coils 318 fixed to the objective lens holder 306a interlink magnetic flux produced in a gap 319a of a magnetic circuit 319. When the coils 317 and 318 are energized, forces oriented in the focusing direction F and the radial direction R are produced and thus, the objective lens holder 306a and the objective lens 306 can be moved in the focusing direction F and the radial direction R.

Hereinafter, regarding the objective lens actuator of FIG. 28, support and positional adjustment of the objective lens 306 in the method of the present invention are described in more detail. FIGS. 29A to 29C illustrate only the objective lens 306 and the objective lens holder 306a in the objective lens actuator of FIG. 28. As shown in FIG. 29A, objective lens support members 321a, 321b and 321c have base portions 321a-2, 321b-2 and 321c-2 and distal end portions 321a-1, 321b-1 and 321c-1 bent from the base portions 321a-2, 321b-2 and 321c-2, respectively. The distal end portions 321a-1, 321b-1 and 321c-1 are brought into contact with a lower face of a circular flange portion 306b of the objective lens 306. Meanwhile, the base portions 321a-2, 321b-2 and 321c-2 of the objective lens support members 321a, 321b and 321c are secured to the objective lens holder 306a.

The objective lens support members 321a, 321b and 321c are made of shape memory alloy such as Ni—Ti alloy and Cu—Zn—Al alloy. The Af point of shape memory alloy changes due to slight difference of its composition. In the case of Ni—Ti alloy, the Af point changes to 30° to 100° C. approximately when content of Ni is changed between 53 and 56 wt. %. Difference between the Ms point and the Af point ranges from several ° C to about 50° C. In view of temperature of environment for operating appliances for home use and heat produced by the appliances, composition of the shape memory alloy used for the objective lens support members 321a, 321b and 321c is adjusted such that the Af point of the shape memory alloy is set higher than 80° C.

In the method of the present invention, the objective lens support members 321a, 321b and 321c are, respectively, bent initially about heating portions 322a, 322b, 322c in a direction of a Z-axis, i.e., in a direction in which a reference surface 324 of the objective lens support members 321a, 321b and 321c faces as shown in FIG. 29D. In this state, the objective lens support members 321a, 321b and 321c are heat-treated at a temperature of 400° to 900° C., preferably, 500° to 600° C. for about 1 h, such that this bent shape is memorized in the objective lens support members 321a, 321b and 321c. The reference surface 324 acts as a reference surface for securing the objective lens 306 to the objective lens holder 306a.

Subsequently, as shown in FIG. 29E, the deformed portions, namely, the distal end portions 321a-1, 321b-1 and 321c-1 are plastically deformed about the heating portions 322a, 322b and 322c in a direction opposite to that of the Z-axis at less than the Ms point such that the objective lens support members 321a, 321b and 321c are formed into a flat shape. Then, the base portions 321a-2, 321b-2 and 321c-2 of the objective lens support members 321a, 321b and 321c are bonded to the objective lens holder 306a at ordinary temperature, that must below the shape recovery temperature. Thereafter, the objective lens 306 is attached to the distal end portions 321a-1, 321b-1 and 321c-1 of the objective lens support members 321a, 321b and 321c by adhesives Wa, Wb and Wc, respectively and thus, an objective lens assembly shown in FIGS. 29A to 29C is obtained.

Alternatively, after the objective lens 306 and the objective lens support members 321a to 321c have been bonded to each other, the objective lens support members 321a to 321c are attached to the objective lens holder 306a. When the objective lens support members 321a to 321c are attached to the objective lens holder 306a, such a phenomenon should be avoided in which the objective lens support members 321a to 321c are subjected to transformation upon heating so as to be turned to the memorized shape from the plastically deformed shape. In the case of thermosetting adhesive, it is preferable to this end that its curing temperature is far lower than the transformation point of the alloy. Meanwhile, ultraviolet-curing adhesive or anaerobic adhesive is preferable because they do not require to be heated for curing.

In FIG. 29A, the objective lens 306 are depicted so as to be supported at a circumferential interval of about 120° by the objective lens support members 321a to 321c of identical configuration for simplicity of illustration. However, it is essential not to destroy balance in servo action of the objective lens 306 in the focusing direction F and the radial direction R. For example, if servo action of the objective lens 306 is not well balanced only by the objective lens support members 321a to 321c, a dummy member acting as a balancer may be mounted on the objective lens holder 306a.

The objective lens assembly constituted by the objective lens 306, the objective lens holder 306a and the objective lens support members 321a to 321c is fixed to an actuator body of the objective lens actuator of FIG. 28. The flange portion 306b of the objective lens 306 is supported by the objective lens support members 321a to 321c secured to the objective lens holder 306a.

Thermal energy is independently given to the objective lens support members 321a to 321c. At this time, by adjusting area of shape recovery or volume of shape recovery in view of depth, it is possible to control amount of displacement of the distal end portions 321a-1 to 321c-1 in the direction of the Z-axis.

In FIGS. 30A to 30C, the objective lens support members 321a, 321b and 321c are locally heated by laser beams 400a, 400b and 400c, respectively. By adjusting irradiation energy and irradiation area of the laser beams 400a to 400c, angle θ of inclination and height of the objective lens 306 in a direction of an optical axis 307a from a light source can be adjusted. The laser beams 400a to 400c oscillated by a laser oscillator (not shown) are arranged to be focused on the objective lens support members 321a to 321c or brought out of focus from the objective lens support members 321a to 321c intentionally for effective local heating. The laser beams 400a to 400c may be of any type capable of partially heating the heating portions 322a to 322c to more than the Af point. However, a YAG laser in which power can be controlled by pulse width is preferable.

When the laser beam 400 is irradiated to the heating portion 322 of the objective lens support member 321, rough adjustment and fine adjustment of height of the objective lens 306 can be performed on the order of submicrons by changing irradiation region of the laser beam 400 while fixing power of the laser beam 400. Meanwhile, if irradiation period of the laser beam 400 is changed while fixing irradiation region of the laser beam 400, depth of the transformed portion of the heating portion 322 in a direction of its thickness can be controlled and thus, rough adjustment and fine adjustment of height of the objective lens 306 can be performed on the order of submicrons. Furthermore, when control of irradiation area of the laser beam 400 and control of irradiation period of the laser beam 400 are combined with each other, rough adjustment and fine adjustment of height of the objective lens 306 can be performed on the order of submicrons.

Specifically, in case the laser beam 400 having a spot diameter of 100 µm is irradiated only once for 100 ms to a substantially central portion of each of the heating portions 322a to 322c, which is enclosed by a circular broken line in FIG. 29A, the objective lens 306 can be displaced through 1 µm in the focusing direction F. Meanwhile, at this time, the laser beam 400 has an irradiation energy density of $1.3 \times 10^3$ W/cm$^2$ and applied energy is 10 mJ.

More specifically, when the optical axis of the objective lens 306 is inclined through an angle θ relative to the optical axis 307a from the light source as shown in FIG. 30A, the laser beams 400a, 400b and 400c are, respectively, irradiated to the heating portions 322a, 322b and 322c of the objective lens support members 321a, 321b and 321c as shown in FIG. 30B. Inclination of the objective lens 306 relative to the optical axis 307a is adjusted by this irradiation and irradiation period and irradiation times of each of the laser beams 400a to 400c are set such that the optical axis of the objective lens 306 coincides with the optical axis 307a from the light source as shown in FIG. 30C.

Amount of inclination of the objective lens 306 can be measured by observing shape of the laser beam focused by the objective lens 306. Meanwhile, this amount of inclination of the objective lens 306 can also be measured by observing with a specific observer an angle formed between an assembly reference surface (not shown) and the flange portion 306b of the objective lens 306.

In this embodiment, in order to displace the distal end portions 321a-1 to 321c-1 of the objective lens support members 321a to 321c, phase change of the shape memory material forming the distal end portions 321a-1 to 321c-1 is utilized. Therefore, in this embodiment, adjusted position (attitude) of the objective lens 306 can be fixed permanently. Accordingly, since the objective lens 306 is not required to be bonded to the objective lens holder 306a after adjustment so as to be fixed to the objective lens holder 306a, a hitherto required bonding step after adjustment can be eliminated.

Meanwhile, in case an actuator to which the objective lens holder 306a is secured or a pickup has an assembly error Δ in the focusing direction F as shown in FIG. 31A, the laser beams 400a to 400c are irradiated to the objective lens support members 321a to 321c, respectively as shown in FIG. 31B. At this time, by controlling irradiation area, irradiation period and irradiation times of each of the laser beams 400a to 400c, amount of displacement of each of the distal end portions 321a-1 to 321c-1 of the objective lens support members 321a to 321c such that amount of displacement of the objective lens 306 in the focusing direction Z is controlled. As a result, the assembly error Δ in the focusing direction F can be eliminated as shown in FIG. 31C.

When a mirror (not shown) is provided at a reference height 330 (FIG. 31A) of a turntable and height of the objective lens 306 is adjusted such that the mirror is disposed at a focal point 331 of the objective lens 306, such a phenomenon takes place in which since an oscillator is formed by the mirror and a cleavage face of a laser diode light source in the pickup, output of the laser diode light source increases. Therefore, if a stray light detector (not shown) in the pickup monitors this output and detects increase of the output, it is found that adjustment of height of the objective lens 306 has been completed.

Meanwhile, adjustment of inclination of the objective lens 306 shown in FIGS. 30A to 30C and adjustment of height of the objective lens 306 shown in FIGS. 31A to 31C can also be performed concurrently by controlling irradiation location, irradiation area and irradiation period of the laser beam.

As described above, in this embodiment, adjustment of the optical axis of the objective lens 306 can be performed without using a spacer and a screw. Therefore, period and operation for performing positional adjustment of the objective lens 306 can be reduced and a positional adjustment apparatus can be made compact in size. Furthermore, in this embodiment, minute displacement of the objective lens support members 321 based on local phase change is utilized, positional adjustment of the objective lens can be performed accurately on the order of submicrons. Meanwhile, since the objective lens 306 is supported at its three circumferential locations by the objective lens support members 321, not only inclination of the optical axis of the objective lens 306 but position (height) of the objective lens 306 in the direction of the optical axis can be adjusted. Therefore, positional adjustment of the objective lens 306 can be performed quite efficiently and can be automated. Furthermore, since the positional adjustment apparatus can act not only as an inclination adjustment mechanism but as a height adjustment mechanism, the height adjustment mechanism is not required to provided additionally. As a result, an objective lens actuator for driving the objective lens 306 can be made compact and a pickup including the objective lens actuator and an optical disk apparatus can be advantageously made thin and compact.

Meanwhile, in this embodiment, the objective lens support members 321 are made of shape memory alloy. Since the Af point of shape memory alloy can be set higher than 80° C., period required for heat dissipation can be reduced. Therefore, period required for positional adjustment can be shortened, thereby resulting in rise of production efficiency. Furthermore, in this embodiment, since the objective lens support members 321 are subjected to local shape recovery by using the laser beams, the objective lens support members 321 can be displaced without mechanical contact with the objective lens support members 321. Therefore, positional adjustment of the objective lens 306 can be performed especially accurately. Meanwhile, in this embodiment, even if curing shrinkage of adhesive occurs, attitudinal and positional adjustments of the objective lens 306 can be subsequently performed advantageously. Moreover, in this embodiment, the attitudinal and positional adjustment mechanisms can be simplified structurally and thus, can be made lighter in weight. As a result, servo systems for driving the objective lens 306 in the focusing direction and the radial direction can be designed with less restriction and thus, the positional adjustment apparatus as a whole can be made more compact and lighter effectively.

Meanwhile, in this embodiment, the laser beams are used as heating means for heating the heating portions 322a to 322c of the objective lens support members 321a to 321c. However, in place of the laser beam, a heating tool such as a thermal head may also be employed and is brought into contact with the objective lens support members 321a to 321c so as to adjust inclination and height of the objective lens 306.

For heating the objective lens support members 321a to 321c, any local heating method such as a laser, a heater, an electron beam, etc. may be adopted. However, since temperature, irradiation area, irradiation period, etc. can be adjusted easily in the laser, the laser is employed in this embodiment.

As is clear from the foregoing description, in the method of claim 23, the support member is locally heated to more than the shape recovery temperature so as to subject the support member to shape recovery such that the optical axis of the objective lens can be adjusted relative to the optical axis from the light source. Thus, in the method of claim 23, the optical axis of the objective lens can be adjusted without using a spacer or a screw. Therefore, period and operation for adjusting position of the objective lens can be reduced and the positional adjustment apparatus can be made compact in size. Furthermore, since minute displacement of the support member based on local phase change of the support member is utilized, positional adjustment of the objective lens can be performed accurately on the order of submicrons.

Meanwhile, in the method of claim 24, since the objective lens is supported at not less than three circumferential locations by the support member, not only inclination of the optical axis of the objective lens but position (height) of the objective lens in the direction of the optical axis of the objective lens can be adjusted. Therefore, as compared with adjustment operation for adjusting only inclination of the objective lens, adjustment operation can be performed remarkably efficiently and can be automated. Meanwhile, since the positional adjustment apparatus can act not only as an inclination adjustment mechanism but as a height adjustment mechanism, the height adjustment mechanism is not required to be provided additionally. As a result, the objective lens actuator for driving the objective lens can be made compact and the pickup including the objective lens actuator and the optical disk apparatus can be advantageously made thin and compact.

Furthermore, in the method of claim 25, the support member is made of shape memory alloy. Since the Af point of shape memory alloy can be set higher than 80° C., period required for heat dissipation can be reduced. Therefore, period required for positional adjustment can be shortened, thereby resulting in rise of production efficiency.

Moreover, in the method of claim 26, since the support member is subjected to local shape memory by using the laser beam, the support member can be displaced without mechanical contact with the support member. Therefore, positional adjustment of the objective lens can be performed especially accurately.

In addition, in the method of the present invention, even if curing shrinkage of adhesive occurs, attitudinal and positional adjustments of the objective lens can be subsequently performed advantageously. Meanwhile, in the method of the present invention, the attitudinal and positional adjustment mechanisms can be simplified structurally and thus, can be made lighter. As a result, the servo systems for driving the objective lens in the focusing direction and the radial direction can be designed with less restriction and thus, the positional adjustment apparatus as a whole can be made more compact and lighter advantageously.

What is claimed is:

1. A positionally adjustable member made from a shape memory effect material having a characteristic shape recovery temperature and including:

a positionally adjustable portion;

a secondary portion; and a deformation portion between said positionally adjustable portion and said secondary portion;

wherein the member memorizes a first configuration by placing the member in said first configuration at temperature above said shape recovery temperature;

wherein the member adopts a second configuration by way of deforming said first configuration of the member at said deformation portion at a temperature below said shape recovery temperature;

wherein said positionally adjustable portion incrementally returns towards said first configuration from said second configuration by way of a local application of heat to said deformation portion, while the member is at a temperature below said shape recovery temperature.

2. The member as claimed in claim 1, wherein a magnitude of said incremental return towards said first configuration from said second configuration is proportional to an amount of heat locally applied to said deformation portion.

3. The member as claimed in claim 1, wherein the member adopts said second configuration by way of torsionally deforming said first configuration of the member at said deformation portion at a temperature below said shape recovery temperature.

4. The member as claimed in claim 1, wherein the member adopts said second configuration by way of bendingly deforming said first configuration of the member at said deformation portion at a temperature below said shape recovery temperature.

5. The member as claimed in claim 1, wherein the member is made from a shape memory effect metallic alloy.

6. The member as claimed in claim 1, wherein said positionally adjustable portion is adapted to have a magnetic head chip mounted thereon.

7. The member as claimed in claim 1, further including a resinous portion connected with said secondary portion.

8. The member as claimed in claim 7, further including a frame surrounding said resinous portion, said frame being connected to said secondary portion.

9. The member as claimed in claim 7, wherein said resinous portion is made from a polymeric resin.

10. The member as claimed in claim 1, including:
   first and second positionally adjustable portions;
   first and second secondary portions; and
   first and second deformation portions between said first positionally adjustable portion and said first secondary portion, and between said second positionally adjustable portion and said second secondary portion, respectively.

11. The member as claimed in claim 4, wherein the member adopts said second configuration by way of bendingly deforming said first configuration of the member at said deformation portion in a first direction and a second direction opposite to said first direction at a temperature below said shape recovery temperature.

12. The member as claimed in claim 1, wherein said positionally adjustable portion incrementally returns towards said first configuration from said second configuration by way of local application of heat to said deformation portion with a laser beam.

13. A mounting member for a magnetic playback chip comprising:
   a base plate; and
   at least one positionally adjustable member extending from said base plate and being adapted to receive a magnetic playback chip thereon, said at least one positionally adjustable member being made from a shape memory effect material having a characteristic shape recovery temperature,
   wherein said at least one positionally adjustable member memorizes a first configuration by placing said at least one positionally adjustable member into said first configuration at a temperature above said shape recovery temperature;
   wherein said at least one positionally adjustable member adopts a second configuration by deforming said first configuration of said at least one positionally adjustable member at a temperature below said shape recovery temperature, so as to assume said second configuration;
   wherein said at least one positionally adjustable member in said second configuration incrementally returns towards said first configuration by way of a local application of heat to a portion of said at least one positionally adjustable member, while said at least one positionally adjustable member is below said shape recovery temperature.

14. The mounting member as claimed in claim 13, wherein said base plate is made from a shape memory effect material and is contiguous with said at least one positionally adjustable member.

15. The mounting member as claimed in claim 13, wherein said base plate is made from a resinous material.

16. The mounting member as claimed in claim 13, comprising two said positionally adjustable members.

17. A magnetic playback head comprising:
   a base plate;
   at least one positionally adjustable member extending from said base plate, said at least one positionally adjustable member being made from a shape memory effect material having a characteristic shape recovery temperature,
   wherein said at least one positionally adjustable member memorizes a first configuration by placing said at least one positionally adjustable member into said first configuration at a temperature above said shape recovery temperature;
   wherein said at least one positionally adjustable member adopts a second configuration by deforming said first configuration of said at least one positionally adjustable member at a temperature below said shape recovery temperature, so as to assume said second configuration;
   wherein said at least one positionally adjustable member in said second configuration incrementally returns towards said first configuration by way of a local application of heat to a portion of said at least one positionally adjustable member, while said at least one positionally adjustable member is below said shape recovery temperature; and
   a magnetic playback chip mounted on said at least one positionally adjustable member.

18. The magnetic playback head as claimed in claim 17, wherein said base plate is made from a shape memory effect material and is contiguous with said at least one positionally adjustable member.

19. The magnetic playback head as claimed in claim 17, wherein said base plate is made from a resinous material.

20. The magnetic playback head as claimed in claim 17, comprising two said positionally adjustable members each having a respective magnetic playback chip mounted thereon.

21. A magnetic playback drum comprising:
   a rotatable drum; and
   at least one magnetic playback head mounted on said drum, said at least one magnetic playback head comprising:
   a base plate mounted on said drum;
   at least one positionally adjustable member extending from said base plate, said at least one positionally adjustable member being made from a shape memory effect material having a characteristic shape recovery temperature,
   wherein said at least one positionally adjustable member memorizes a first configuration by placing said at least one positionally adjustable member into said first configuration at a temperature above said shape recovery temperature;
   wherein said at least one positionally adjustable member adopts a second configuration by deforming said first configuration of said at least one positionally adjustable member at a temperature below said shape recovery temperature, so as to assume said second configuration;
   wherein said at least one positionally adjustable member in said second configuration incrementally returns towards said first configuration by way of a local application of heat to a portion of said at least one positionally adjustable member, while said at least one positionally adjustable member is below said shape recovery temperature; and a magnetic playback chip mounted on said at least one positionally adjustable member.

22. The magnetic playback head as claimed in claim 21, wherein said base plate is made from a shape memory effect material and is contiguous with said at least one positionally adjustable member.

23. The magnetic playback head as claimed in claim 21 wherein said base plate is made from a resinous material.

24. The magnetic playback head as claimed in claim 21 comprising two said positionally adjustable members each having a respective magnetic playback chip mounted thereon.

* * * * *